(12) United States Patent
Sawhney

(10) Patent No.: US 8,408,640 B1
(45) Date of Patent: Apr. 2, 2013

(54) PORTABLE TABLE AND SEATING COMBINATION

(75) Inventor: Ravi K. Sawhney, Thousand Oaks, CA (US)

(73) Assignee: Daniel P. Dooley, Oklahoma City, OK (US)

( * ) Notice: Subject to any disclaimer, the term of this patent is extended or adjusted under 35 U.S.C. 154(b) by 0 days.

(21) Appl. No.: 13/083,221

(22) Filed: Apr. 8, 2011

Related U.S. Application Data

(62) Division of application No. 11/062,279, filed on Feb. 17, 2005, now Pat. No. 7,922,245.

(60) Provisional application No. 60/545,597, filed on Feb. 17, 2004.

(51) Int. Cl.
  *A47B 3/14* (2006.01)
  *A47B 39/06* (2006.01)
  *A47B 83/02* (2006.01)

(52) U.S. Cl. ...................... 297/158.4; 297/139; 297/141; 297/159.1

(58) Field of Classification Search .......... 297/139–142, 297/158.4, 159.1, 17, 217.1; 108/35, 36, 108/50.11, 129
See application file for complete search history.

(56) References Cited

U.S. PATENT DOCUMENTS

| | | | | |
|---|---|---|---|---|
| 1,594,572 | A * | 8/1926 | Soltesz | 297/139 |
| 1,716,612 | A * | 6/1929 | Wing | 190/12 A |
| 2,109,869 | A | 3/1938 | Ross | |
| 2,717,631 | A * | 9/1955 | Howe | 297/158.4 |
| 2,837,141 | A * | 6/1958 | Shore | 297/141 |
| 3,368,504 | A | 2/1968 | Cohen | |
| 3,885,829 | A * | 5/1975 | Haeger | 297/158.4 |
| 4,249,773 | A * | 2/1981 | Giambalvo | 297/158.4 |
| 4,537,443 | A | 8/1985 | Bray | |
| 4,953,913 | A * | 9/1990 | Graebe | 297/452.25 |
| 5,029,938 | A * | 7/1991 | Song | 297/158.4 |
| 5,338,099 | A * | 8/1994 | Ishi et al. | 297/452.33 |
| 5,806,930 | A * | 9/1998 | Knoblock | 297/300.1 |
| 5,992,331 | A | 11/1999 | Inoue et al. | |
| 6,032,590 | A | 3/2000 | Chen | |
| 6,109,687 | A | 8/2000 | Nye et al. | |
| 6,314,891 | B1 | 11/2001 | Larson | |
| 6,431,092 | B1 | 8/2002 | Stanford | |
| 6,443,521 | B1 | 9/2002 | Nye et al. | |
| 6,446,981 | B1 | 9/2002 | Wise et al. | |
| 6,523,485 | B1 | 2/2003 | Cipolla | |
| 6,675,721 | B2 | 1/2004 | Zeiders | |
| 6,905,166 | B2 | 6/2005 | Zhurong et al. | |
| 6,908,159 | B2 * | 6/2005 | Prince et al. | 297/452.23 |
| 7,011,364 | B2 * | 3/2006 | Meskill et al. | 297/158.4 |
| 2005/0052058 | A1 | 3/2005 | Nyo et al. | |

* cited by examiner

*Primary Examiner* — David Dunn
*Assistant Examiner* — Tania Abraham
(74) *Attorney, Agent, or Firm* — Hall Estill Attorneys at Law; Daniel P. Dooley

(57) ABSTRACT

A portable table and seating combination is disclosed. The combination includes at least a first portion of a hinge attached to a tabletop portion. The tabletop portion includes at least a top surface, and a plurality of edge portions extending from the top surface. The top surface in combination with the plurality of edge portions forms a seating confinement compartment. The combination further includes at least a retractable leg support attached to the tabletop portion. The retractable leg support resides adjacent the seating confinement compartment, and in an extended position the retractable leg support, supports the tabletop portion at a predetermined distance above a surface. The combination also includes at least a seating portion configured for confinement within the seating confinement compartment. In a first embodiment, the seating portion is an integrated seating portion. In an alternate embodiment, the seating portion is a freestanding seating portion.

17 Claims, 18 Drawing Sheets

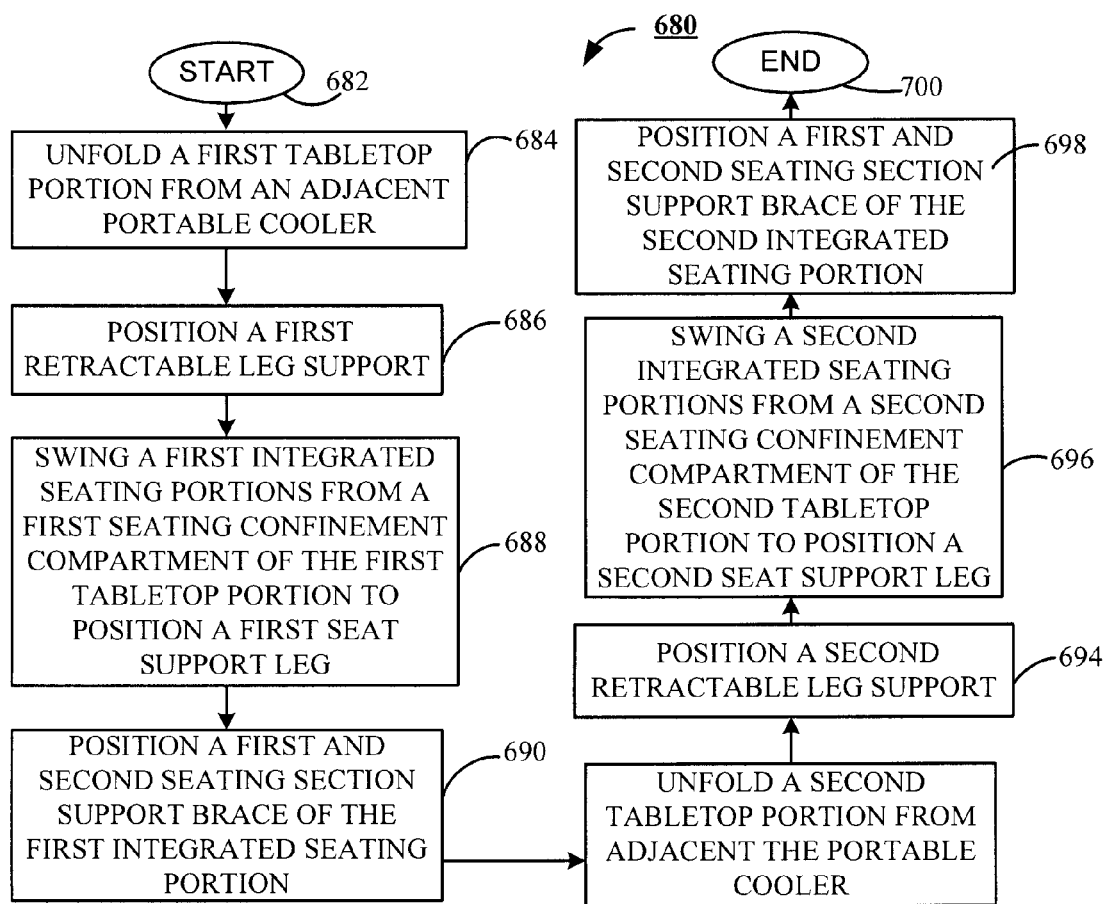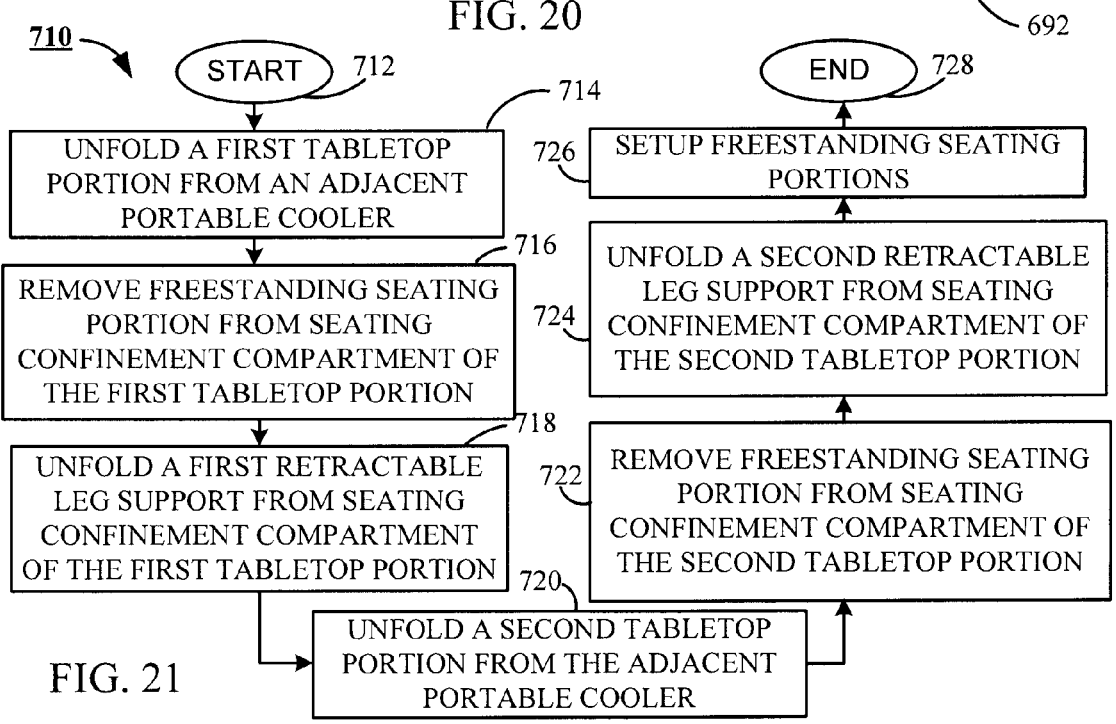

PORTABLE TABLE AND SEATING COMBINATION

CROSS REFERENCE TO RELATED APPLICATIONS

This application is a divisional of U.S. patent application Ser. No. 11/062,279 filed Feb. 17, 2005 entitled, "PORTABLE TABLE AND SEATING COMBINATION," which claims priority to U.S. Provisional Patent Application No. 60/545,597 filed on Feb. 17, 2004, entitled "PORTABLE FOLDING TABLE AND CHAIR SYSTEM."

BACKGROUND OF THE INVENTION

1. Field of the Invention

This invention relates generally to table and chair combinations. More particularly, but not by way of limitation, the present invention relates to a portable table and seating combination.

2. Background:

There exists on the market many portable tables and folding chairs, stools, and backrests. Each of the above listed products utilizes a variety of methods for folding into a compact size for transportation and storage. A common deficiency of each occurs when an individual wishes to use the products in combination. The common deficiency is the inconvenience in making multiple trips to a storage space or auto when trying to set up the table and seating for use.

In lieu of portable table and portable seating arrangements, some individuals have opted to use a useful area on a top surface or lid of a portable cooler as a table top or seat. There also exists on the market many portable coolers, some with wheels, some with handles, and some which can be useful as a makeshift table or seat. A problem with using the lid of existing coolers as a table is the inconvenience of having to remove oneself, or items placed on the lid, to gain access the contents inside of the cooler.

As such, challenges remain and a need persists for improvements in devices and methods for portable table and seating combinations, and it is to these challenges and needs that the present invention is directed.

SUMMARY OF THE INVENTION

A portable table and seating combination is disclosed. Preferably, the combination includes at least a first portion of a hinge attached to a tabletop portion, in which the tabletop portion preferably includes at least a top surface, and a plurality of edge portions extending from the top surface. A seating confinement compartment is preferably formed from the plurality of edge portions in combination with the top surface.

Each embodiment of the present invention preferably further includes at least a retractable leg support attached to the tabletop portion. The retractable leg support resides adjacent the seating confinement compartment, and preferably the retractable leg support supports the tabletop portion at a predetermined distance above a surface when the retractable leg support is in an extended position. Each embodiment also preferably includes at least a seating portion configured for confinement within the seating confinement compartment. In a first embodiment, the seating portion is preferably an integrated seating portion, while in an alternate embodiment; the seating portion is preferably a freestanding seating portion.

In an alternate embodiment, a second portion of the hinge preferably communicates with a portable cooler. The portable cooler preferably includes at least a chest portion supporting a hinged lid, a wheel supporting the chest portion during a transport of the chest portion, and a handle secured to the chest portion for maneuvering the chest portion during the transport of the chest portion.

These and various other features and advantages, which characterize the present invention, will be apparent from a reading of the following detailed description and a review of the associated drawings.

BRIEF DESCRIPTION OF THE DRAWINGS

FIG. 20 provides a flow chart of a method of setting up for use the inventive portable table and seat combination of FIG. 12.

FIG. 21 provides a flow chart of a method of setting up for use the inventive portable table and seat combination of FIG. 14.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
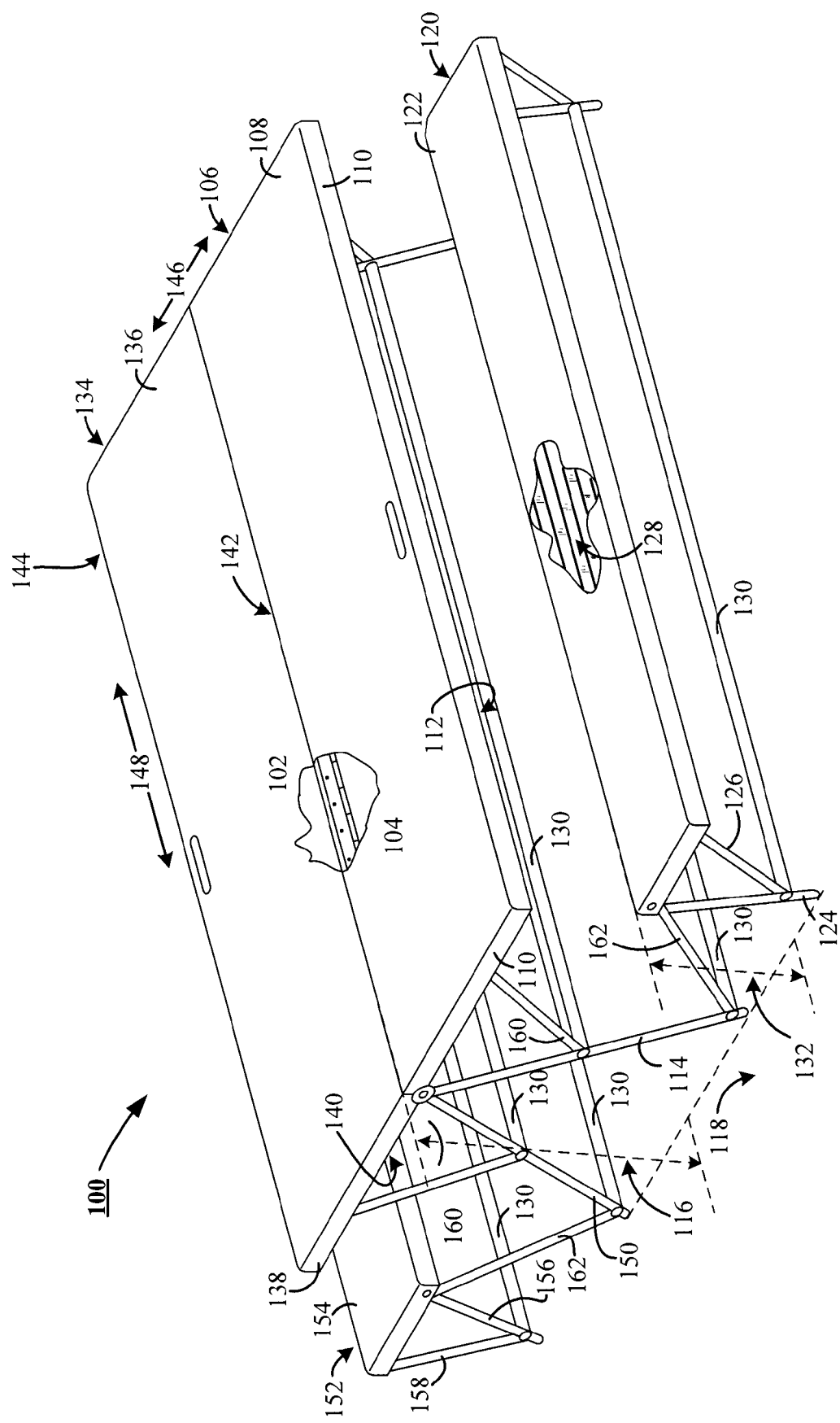
FIG. 1 provides a top side perspective view of a preferred embodiment of the present inventive portable table and seat combination.

Referring now to the drawings, wherein like reference numerals indicate the same parts throughout the several views, a preferred embodiment of an inventive portable table and seat combination 100 of FIG. 1 includes at least: a first portion 102 of a hinge 104 secured to a first tabletop portion 106. The first tabletop portion 106 includes at least a top surface 108, and a plurality of edge portions 110. The plurality of the edge portions 110 in combination with the top surface 108 defines and forms a first seating confinement compartment 112.

Further shown by FIG. 1 is a first retractable leg support 114 attached to the tabletop portion 106. In an extended position, as shown by FIG. 1, the first retractable leg support 114 supports the first tabletop portion 106, at a predetermined distance 116 above a surface 118. FIG. 1 also shows a first integrated seating portion 120 configured for confinement within the first seating confinement compartment 112. Preferably, the first integrated seating portion 120 includes at least a seating section 122 supported by a first seat support leg 124, and a first seating section support brace 126.

In a preferred embodiment, the first integrated seating portion 120 and the first tabletop portion 106 are each formed from an ultraviolet light (UV) tolerant polymer. However, other materials such as fiberglass encapsulated in a UV tolerant resin, carbon fiber composites, and aluminum have been shown to be useful materials for both the first integrated seating portion 120 and the first tabletop portion 106. It is noted that the list of materials identified as material suitable for use in forming the first integrated seating portion 120 in a first tabletop portion 106 is only an exemplary list, and does not impose any limitations on the present invention. Those skilled in the art will recognize other materials suitable for use in forming the seating portion and the first tabletop portion 106.

Preferably, aluminum tubing is used in forming the bracing system of the present inventive portable table and seat combination 100. However, other materials found useful in forming the bracing system of the present inventive portable table and seat combination 100 includes at least: aluminum channeling; carbon fiber rods; and fiberglass rods. It is also noted that the list of materials identified as material suitable for use in forming the bracing system of the present inventive portable table and seat combination 100 is only an exemplary list, and does not impose any limitations on the present invention. Those skilled in the art will recognize other materials suitable for use.

When forming the first integrated seating portion 120 from among the materials identified hereinabove, the inclusion of a plurality of support ribs 128 has been found useful. The inclusion of the plurality of support ribs 128 mitigate an amount of sagging experienced by the first integrated seating portion 120 during use by a plurality of individuals. It has also been found useful to include a plurality of stabilization bars 130. A first of the plurality of stabilization bars 130 is attached between corresponding first seat support legs 124. In a preferred embodiment, two additional stabilization bars of the plurality of stabilization bars 130 are secured between corresponding first retractable leg supports 114.

As shown by FIG. 1, the first integrated seating portion 120 is configured into a support configuration. When configured into the support configuration, the first seat support leg 124 maintains the seating section 122 a second predetermined distance 132 from and substantially parallel with the surface 118 to accommodate and support seating of an individual upon the seating section 122.

The inventive portable table and seat combination 100 of FIG. 1, further includes at least: a second portion (not shown separately) of the hinge 104 secured to a second tabletop portion 134. The second tabletop portion 134 includes at least a top surface 136, and a plurality of the edge portions 138. The plurality of the edge portions 138 in combination with the top surface 136 defines and forms a second seating confinement compartment 140. Upon attachment of the hinge 104 to each the first and second tabletop portions (106, 134) a hinged joint 142 between the first and second tabletop portions (106, 134) is formed and a tabletop 144 is defined, wherein the defined tabletop 144 comprises a width 146 and a length 148.

Continuing with FIG. 1, shown therein is a second retractable leg support 150 attached to the second tabletop portion 134. In an extended position, as shown by FIG. 1, the second retractable leg support 150 supports the second tabletop portion 134 the predetermined distance 116 above the surface 118. FIG. 1 also shows a second integrated seating portion 152 configured for confinement within the second seating confinement compartment 140. Preferably, the second integrated seating portion 152 includes at least: a second seating section 154 supported by a second seat support leg 156; and a second seating section support brace 158. Further included in the bracing system of the inventive portable table and seat combination 100, are tabletop support braces 160 supporting respectively the first and second tabletop portions (106, 134); and respective first and second seating portion support braces 162 respectively supporting the first and second integrated seating portions (120, 152).

Figure 2A:
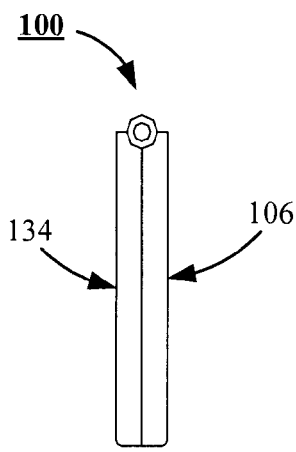
FIG. 2A provides a side elevational view of the preferred embodiment of the inventive combination of FIG. 1 in a retracted mode.
Figure 2B:
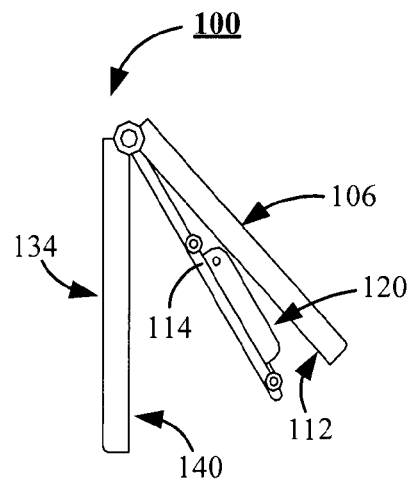
FIG. 2B provides a side elevational view of the preferred embodiment of the inventive combination of FIG. 1 in a first opening mode.
Figure 2C:
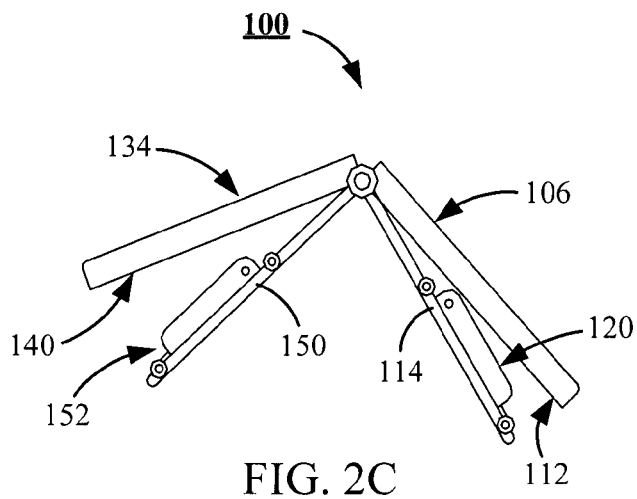
FIG. 2C provides a side elevational view of the preferred embodiment of the inventive combination of FIG. 1 in a second opening mode.

Turning to FIGS. 2A-2G, shown therein are drawings depicting a sequence of steps for setting up the inventive portable table and seat combination 100 of FIG. 1 for use. FIG. 2A shows the combination 100 in a storage configuration. In the storage configuration, the bracing system of the combination 100, and the first and second integrated seating portions (120, 152) are confined within corresponding seating confinement compartments (112, 140). As shown by FIGS. 2B and 2C, by unfolding the corresponding tabletop portions (106, 134), the corresponding retractable leg supports (114, 150) and the corresponding integrated seating portions (120, 152) are exposed for retraction from their corresponding seating confinement compartments (112, 140).

Figure 2D:
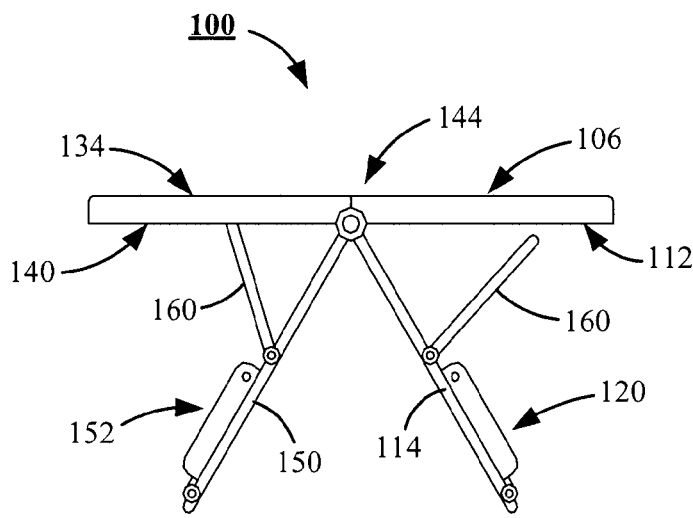
FIG. 2D provides a side elevational view of the preferred embodiment of the inventive combination of FIG. 1 in a third opening mode.
Figure 2E:
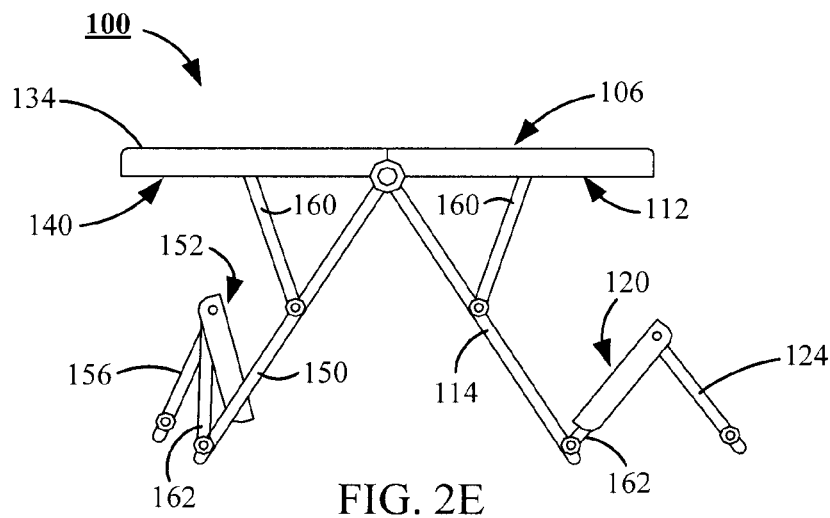
FIG. 2E provides a side elevational view of the preferred embodiment of the inventive combination of FIG. 1 in a fourth opening mode.
Figure 2F:
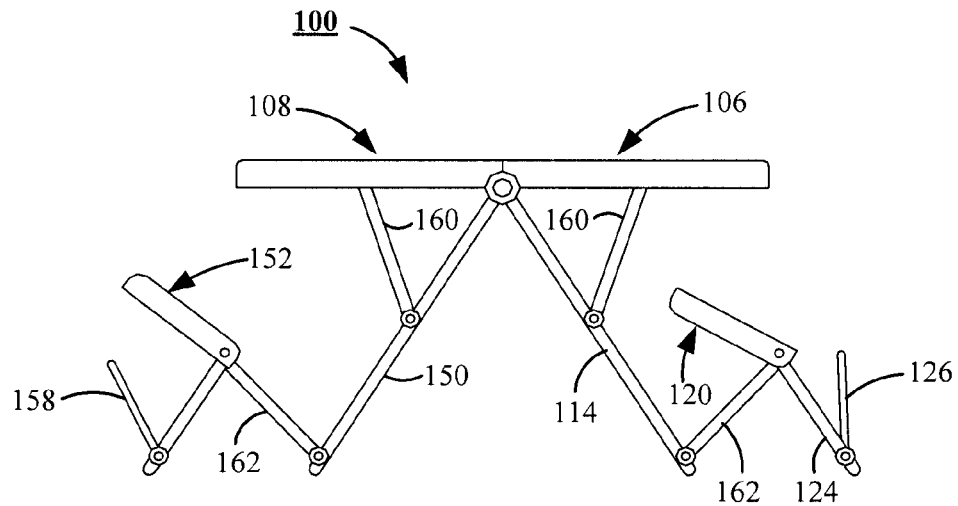
FIG. 2F provides a side elevational view of the preferred embodiment of the inventive combination of FIG. 1 in a fifth opening mode.
Figure 2G:
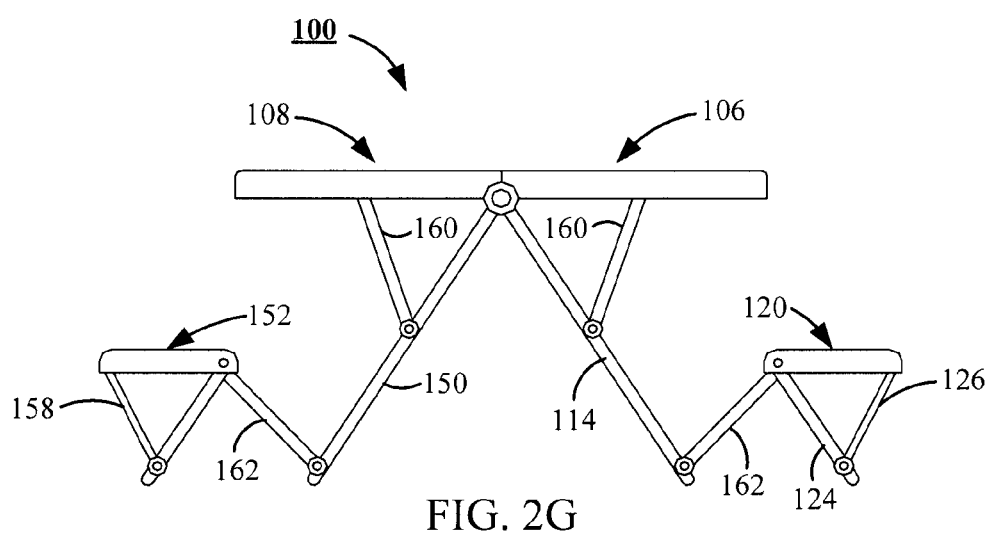
FIG. 2G provides a side elevational view of the preferred embodiment of the inventive combination of FIG. 1 in a final opened mode.

As shown by FIG. 2D, by positioning the tabletop support braces 160 adjacent their corresponding tabletop portions (106, 134), the tabletop 144 is supported and poised for use. FIGS. 2E-2F illustrate a sequence of steps useful for setting up the first and second integrated seating portions (120, 152) for use, and FIG. 2G shows the combination 100 in its final configuration as a portable table and seat combination.

Figure 3:
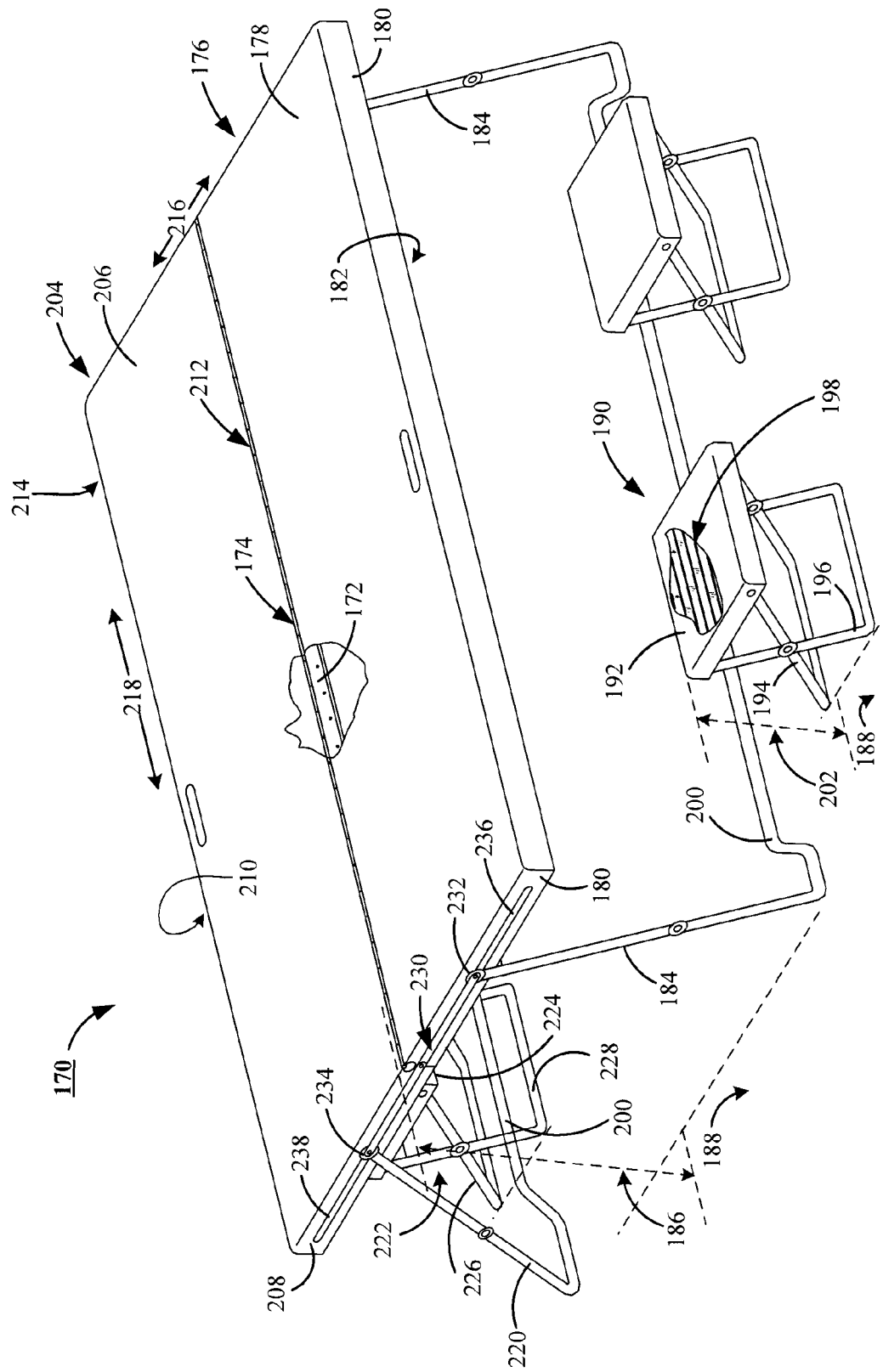
FIG. 3 provides a top side perspective view of an alternate preferred embodiment of the present inventive portable table and seat combination.

FIG. 3 shows an alternate preferred embodiment of a present inventive portable table and seat combination 170, which includes at least: a first portion 172 of a hinge 174 secured to a first tabletop portion 176. The first tabletop portion 176 includes at least a top surface 178, and a plurality of edge portions 180. The plurality of the edge portions 180 in combination with the top surface 178 defines and forms a first seating confinement compartment 182.

Further shown by FIG. 3 is a first retractable leg support 184 attached to the first tabletop portion 176. In an extended position, as shown by FIG. 3, the first retractable leg support 184 (also referred to herein as vertical support portion 184), supports the first tabletop portion 176, at a predetermined distance 186 above a surface 188. FIG. 3 also shows a first freestanding seating portion 190 configured for confinement within the first seating confinement compartment 182. Preferably, the first freestanding seating portion 190 includes at least a seating section 192 supported by a first seat support leg 194, and a first seating section support brace 196.

In a preferred embodiment, the first freestanding seating portion 190 and the first tabletop portion 176 are each formed from an ultraviolet light (UV) tolerant polymer. However, other materials such as fiberglass encapsulated in a UV tolerant resin, carbon fiber composites, and aluminum have been shown to be useful materials for both the first freestanding seating portion 190 and the first tabletop portion 176. It is noted that the list of materials identified as material suitable for use in forming the first freestanding seating portion 190 in the first tabletop portion 176 is only an exemplary list, and does not impose any limitations on the present invention. Those skilled in the art will recognize other materials suitable for use in forming the seating portion and the first tabletop portion 176.

Preferably, aluminum tubing is used in forming the bracing system of the present inventive portable table and seat combination 170. However, other materials found useful in forming the bracing system of the present inventive portable table and seat combination 170 includes at least: aluminum channeling; carbon fiber rods; and fiberglass rods. It is also noted that the list of materials identified as material suitable for use in forming the bracing system of the present inventive portable table and seat combination 170 is only an exemplary list, and does not impose any limitations on the present invention. Those skilled in the art will recognize other materials suitable for use.

When forming the first freestanding seating portion 190 from among the materials identified hereinabove, the inclusion of a plurality of support ribs 198 has been found useful. The inclusion of the plurality of support ribs 198 mitigate an amount of sagging experienced by the first freestanding seating portion 190 during use by an individuals. It has also been found useful to include a plurality of stabilization bars 200. A first of the plurality of stabilization bars 200 is attached between corresponding vertical support portions 184.

As shown by FIG. 3, the first freestanding seating portion 190 is configured into a support configuration. When configured into the support configuration, the first seat support leg 194 maintains the seating section 192, of a second predetermined distance 202 from and substantially parallel with the surface 188 to accommodate and support seating of an individual upon the seating section 192.

The inventive portable table and seat combination 170 of FIG. 3, further includes at least: a second portion (not shown separately) of the hinge 174 secured to a second tabletop portion 204. The second tabletop portion 204 includes at least a top surface 206, and a plurality of the edge portions 208. The plurality of the edge portions 208 in combination with the top surface 206 defines and forms a second seating confinement compartment 210. Upon attachment of the hinge 174 to each the first and second tabletop portions (176, 204) a hinged joint 212 between the first and second tabletop portions (176, 204) is formed and a tabletop 214 is defined, wherein the defined tabletop 214 comprises a width 216 and a length 218.

Continuing with FIG. 3, shown therein is a second retractable leg support 220 attached to the second tabletop portion 204. In an extended position, as shown by FIG. 3, the second retractable leg support 220 supports the second tabletop portion 204 the predetermined distance 186 above the surface 188. FIG. 3 also shows a second freestanding seating portion 222 configured for confinement within the second seating confinement compartment 210. Preferably, the second freestanding seating portion 222 includes at least: a second seating section 224 supported by a second seat support leg 226; and a second seating section support brace 228. Further included in the bracing system of the inventive portable table and seat combination 170, is an interlocking brace 230 respectively interlocking a first and second track trolleys (232, 234). Each of the first and second track trolleys (232, 234) respectively interact with corresponding first and second trolley tracks (236, 238) of the respective first and second tabletop portions (176, 204).

Figure 4A:
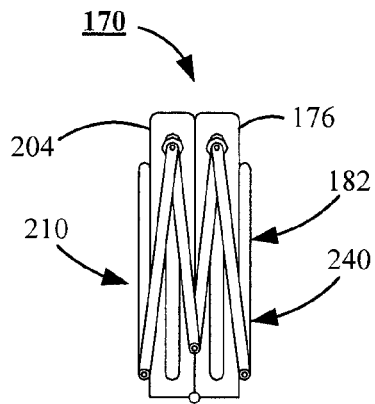
FIG. 4A provides a side elevational view of the alternate preferred embodiment of the inventive combination of FIG. 3 in a retracted mode.
Figure 4B:
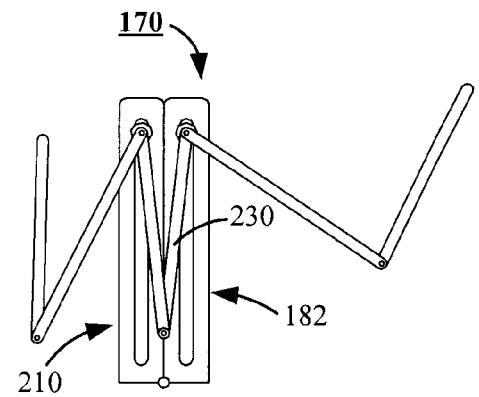
FIG. 4B provides a side elevational view of the alternate preferred embodiment of the inventive combination of FIG. 3 in a first opening mode.
Figure 4C:
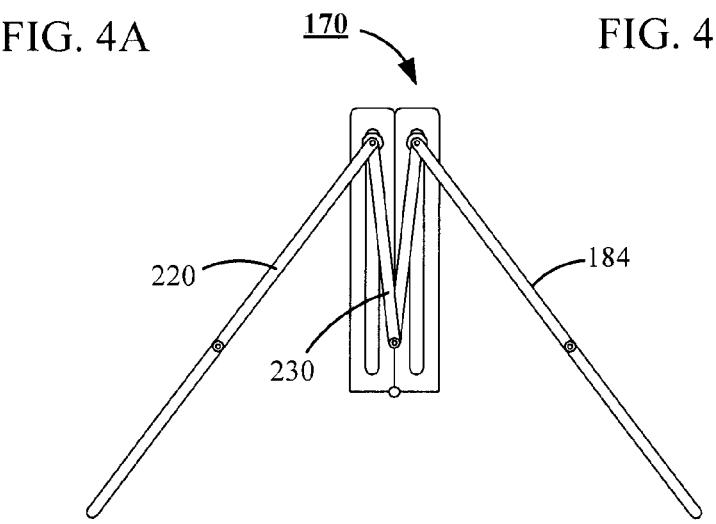
FIG. 4C provides a side elevational view of the alternate preferred embodiment of the inventive combination of FIG. 3 in a second opening mode.
Figure 4D:
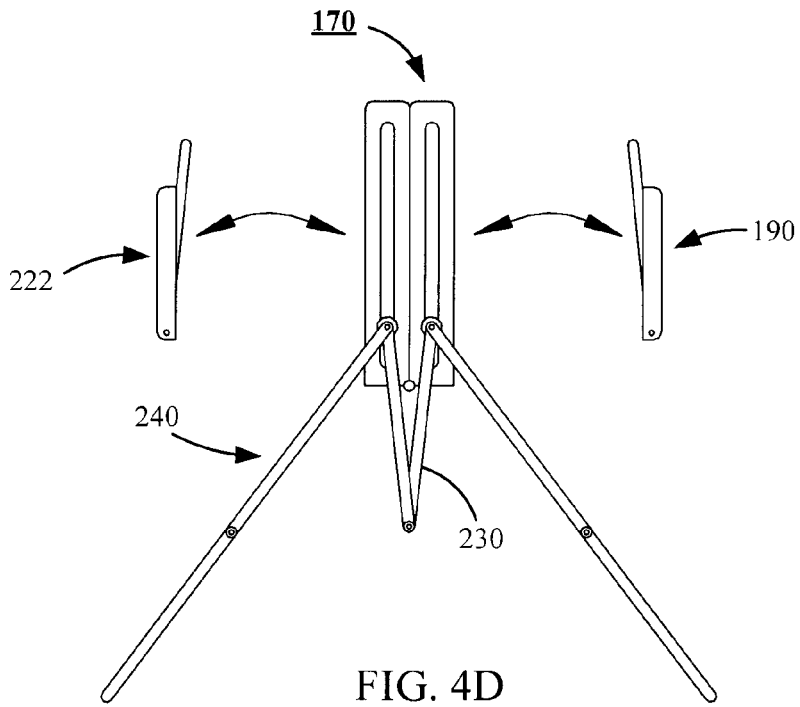
FIG. 4D provides a side elevational view of the alternate preferred embodiment of the inventive combination of FIG. 3 in a third opening mode.

Turning to FIGS. 4A-4F, shown therein are drawings depicting a sequence of steps for setting up the inventive portable table and seat combination 170 of FIG. 3 for use. FIG. 4A shows the combination 170 in a storage configuration. In the storage configuration, a bracing system 240 of the combination 170 is stowed externally and adjacent to the corresponding seating confinement compartments (182, 210) of the corresponding tabletop portions (176, 204). The first and second freestanding seating portions (190, 222) are confined within corresponding seating confinement compartments (182, 210). As shown by FIGS. 4B and 4C, by unfolding the corresponding first and second retractable leg supports (184, 220), the corresponding freestanding seating portions (190, 222) are exposed for retraction from their corresponding seating confinement compartments (182, 210), as shown by FIG. 4D.

Figure 4E:
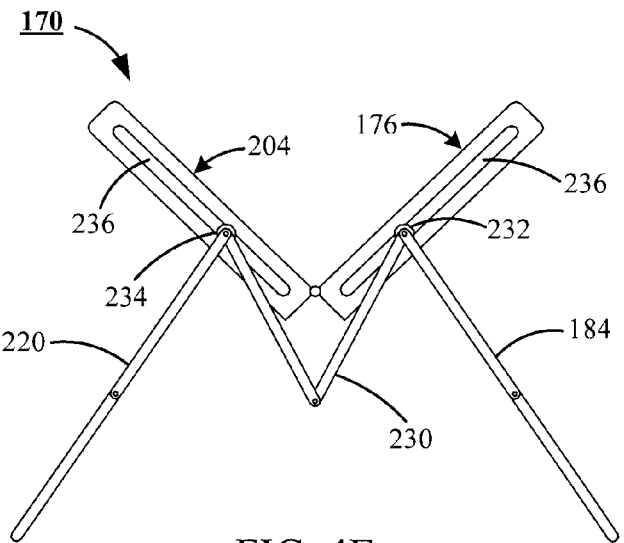
FIG. 4E provides a side elevational view of the alternate preferred embodiment of the inventive combination of FIG. 3 in a fourth opening mode.
Figure 4F:
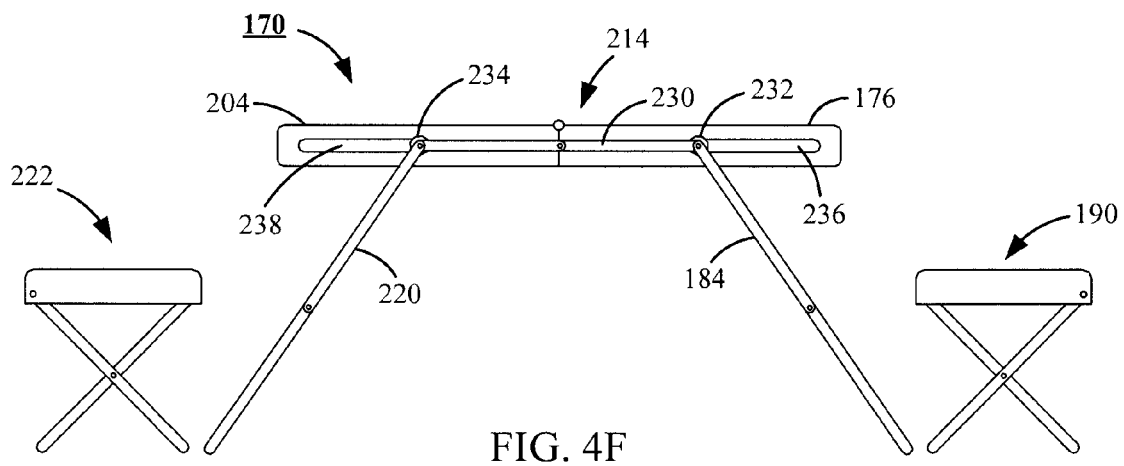
FIG. 4F provides a side elevational view of the alternate preferred embodiment of the inventive combination of FIG. 3 in a final opened mode.

Also shown by FIG. 4D, by elevating the corresponding tabletop portions (176, 204) above the bracing system 240, the corresponding tabletop portions (176, 204), and the corresponding seating confinement compartments (182, 210), are free to rotate in a downwardly manner, as shown by FIG. 4E. As further shown by FIG. 4E, the downwardly rotation of the corresponding tabletop portions (176, 204) causes the first and second track trolleys (232, 234) to respectively move within their corresponding first and second trolley tracks (236, 238). The combination of the movement of the first and second track trolleys (232, 234) within their corresponding first and second trolley tracks (236, 238), and a simultaneous rising of the interlocking brace 230, culminate with the formation of the tabletop 214 of FIG. 4F.

Figure 5:
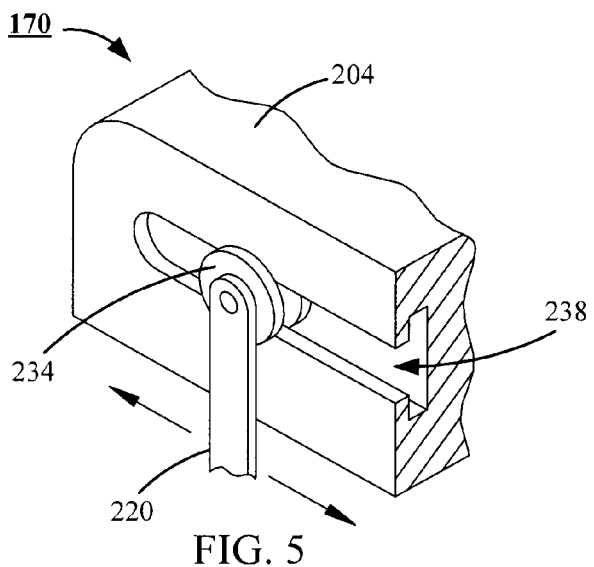
FIG. 5 provides a partial cutaway perspective view of a trolley of a retractable leg support communicating with a track of a corresponding tabletop portion.

FIG. 5 provides a partial cutaway perspective view of the track trolley 234 of the second retractable leg support 220 interacting with the trolley track 238 of its corresponding tabletop portion 204. Inclusion of the trolley track 238 and track trolley 234 combination, provide enhanced operating ease to alternate preferred embodiment of the inventive portable table and seat combination 170 of FIG. 3.

Figure 6:
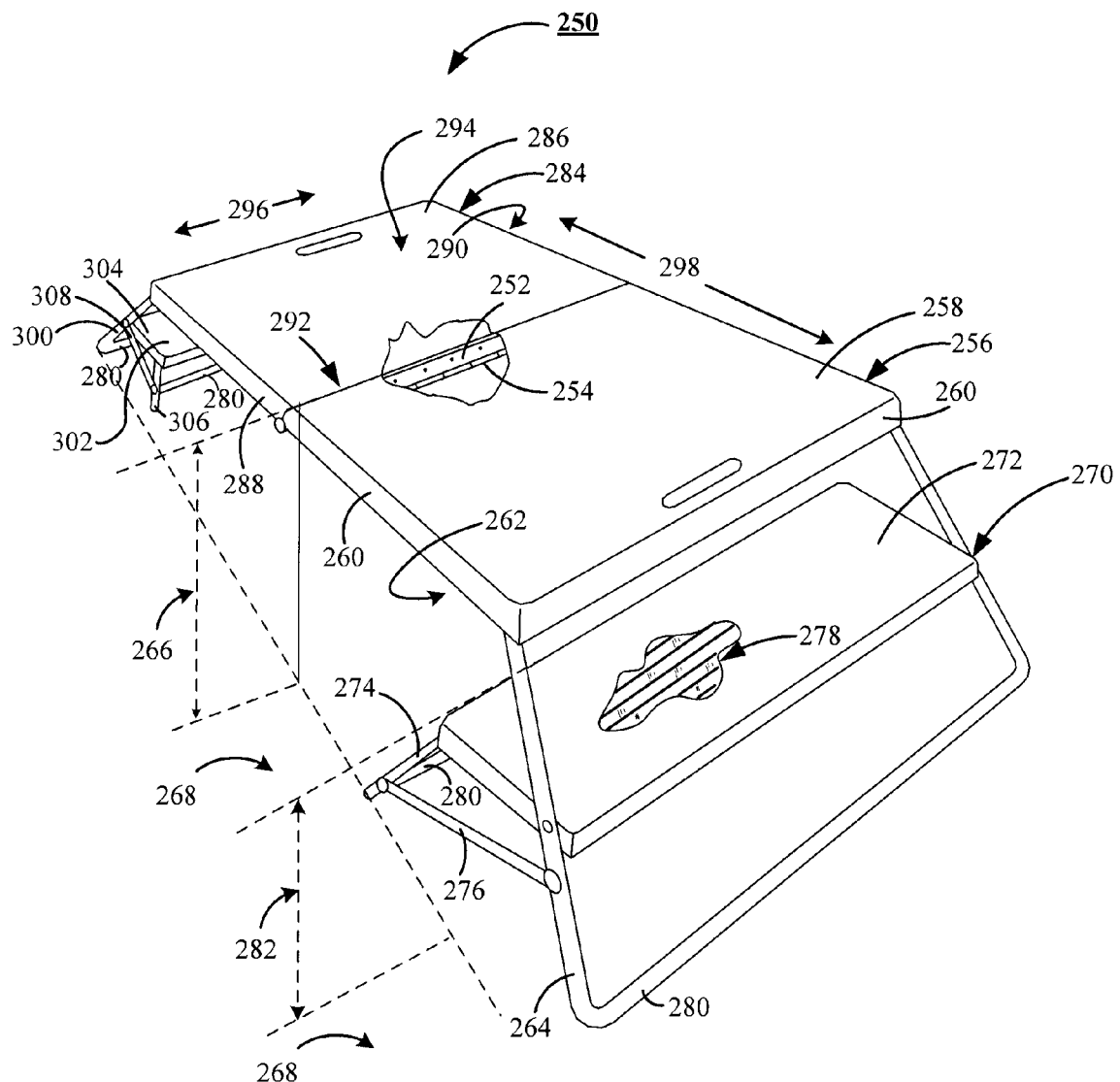
FIG. 6 provides a top side perspective view of an alternative preferred embodiment of the present inventive portable table and seat combination.

FIG. 6 shows an alternative preferred embodiment of the present inventive portable table and seat combination 250, which includes at least: a first portion 252 of a hinge 254 secured to a first tabletop portion 256. The first tabletop portion 256 includes at least a top surface 258, and a plurality of edge portions 260. The plurality of the edge portions 260 in combination with the top surface 258 defines and forms a first seating confinement compartment 262.

Further shown by FIG. 6 is a first retractable leg support 264 attached to the first tabletop portion 256. In an extended position, as shown by FIG. 6, the first retractable leg support 264 supports the first tabletop portion 256, at a predetermined distance 266 above a surface 268. FIG. 6 also shows a first integrated seating portion 270 configured for confinement within the first seating confinement compartment 262. Preferably, the first integrated seating portion 270 includes at least a seating section 272 supported by a first seat support leg 274, and a first seating section support brace 276.

In a preferred embodiment, the first integrated seating portion 270 and the first tabletop portion 256 are each formed from an ultraviolet light (UV) tolerant polymer. However, other materials such as fiberglass encapsulated in a UV tolerant resin, carbon fiber composites, and aluminum have been shown to be useful materials for both the first integrated seating portion 270 and the first tabletop portion 256. It is noted that the list of materials identified as material suitable for use in forming the first integrated seating portion 270 in a first tabletop portion 256 is only an exemplary list, and does not impose any limitations on the present invention. Those skilled in the art will recognize other materials suitable for use in forming the seating portion and the first tabletop portion 256.

Preferably, aluminum tubing is used in forming the bracing system of the present inventive portable table and seat combination 250. However, other materials found useful in forming the bracing system of the present inventive portable table and seat combination 250 includes at least: aluminum channeling; carbon fiber rods; and fiberglass rods. It is also noted that the list of materials identified as material suitable for use in forming the bracing system of the present inventive portable table and seat combination 250 is only an exemplary list, and does not impose any limitations on the present invention. Those skilled in the art will recognize other materials suitable for use.

When forming the first integrated seating portion 270 from among the materials identified hereinabove, the inclusion of a plurality of support ribs 278 has been found useful. The inclusion of the plurality of support ribs 278 mitigate an amount of sagging experienced by the first integrated seating portion 270 during use by a plurality of individuals. It has also been found useful to include a plurality of stabilization bars 280. A first of the plurality of stabilization bars 280 is attached between corresponding first seat support legs 274. In a preferred embodiment, an additional stabilization bar of the plurality of stabilization bars 280 is secured between corresponding first retractable leg supports 264.

As shown by FIG. 6, the first integrated seating portion 250 is configured into a support configuration. When configured into the support configuration, the first seat support leg 274 maintains the seating section 272, at a second predetermined distance 282 from and substantially parallel with the surface 268 to accommodate and support seating of an individual upon the seating section 272.

The inventive portable table and seat combination 250 of FIG. 6, further includes at least: a second portion (not shown separately) of the hinge 254 secured to a second tabletop portion 284. The second tabletop portion 284 includes at least a top surface 286, and a plurality of the edge portions 288. The plurality of the edge portions 288 in combination with the top surface 286 defines and forms a second seating confinement compartment 290. Upon attachment of the hinge 254 to each the first and second tabletop portions (256, 284) a hinged joint 292 between the first and second tabletop portions (256, 258) is formed and a tabletop 294 is defined, wherein the defined tabletop 294 comprises a width 296 and a length 298.

Continuing with FIG. 6, shown therein is a second retractable leg support 300 attached to the second tabletop portion 284. In an extended position, as shown by FIG. 6, the second retractable leg support 300, supports the second tabletop portion 284 at the predetermined distance 266 above the surface 268. FIG. 6 also shows a second integrated seating portion 302 configured for confinement within the second seating confinement compartment 290. Preferably, the second integrated seating portion 302 includes at least: a second seating section 304 supported by a second seat support leg 306; and a second seating section support brace 308.

Figure 7A:
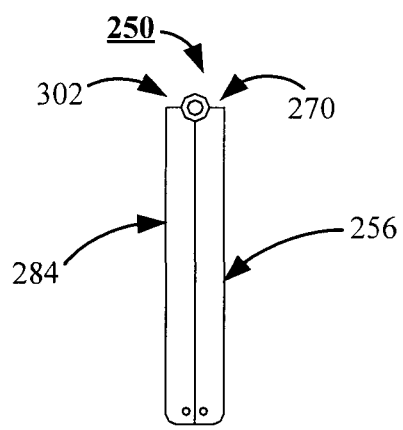
FIG. 7A provides a side elevational view of the alternative preferred embodiment of the inventive combination of FIG. 6 in a retracted mode.
Figure 7B:
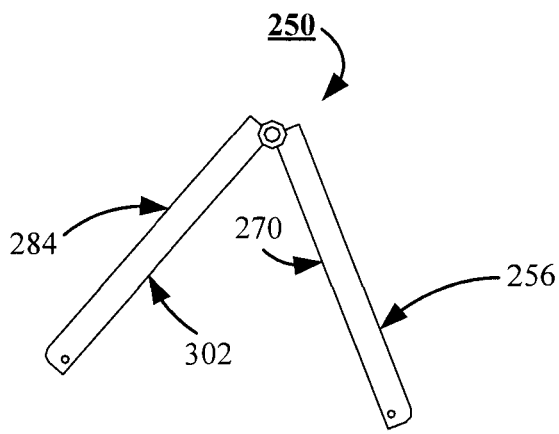
FIG. 7B provides a side elevational view of the alternative preferred embodiment of the inventive combination of FIG. 6 in a first opening mode.
Figure 7C:
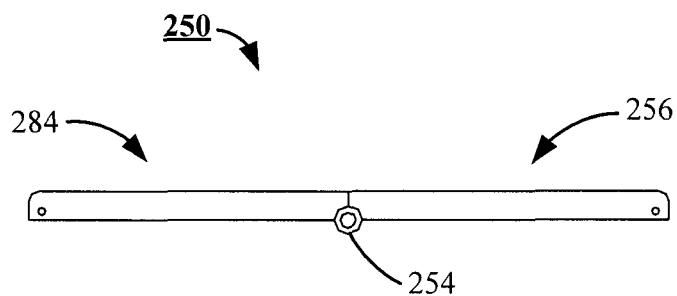
FIG. 7C provides a side elevational view of the alternative preferred embodiment of the inventive combination of FIG. 6 in a second opening mode.
Figure 7D:
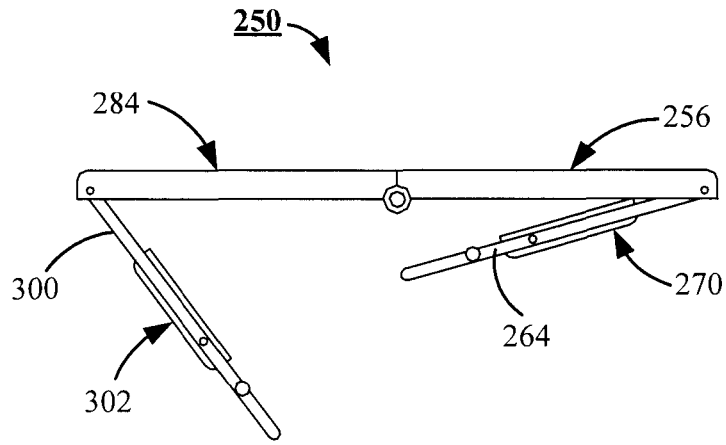
FIG. 7D provides a side elevational view of the alternative preferred embodiment of the inventive combination of FIG. 6 in a third opening mode.

Turning to FIGS. 7A-7G, shown therein are drawings depicting a sequence of steps for setting up the inventive portable table and seat combination 250 of FIG. 6 for use. FIG. 7A shows the combination 250 in a storage configuration. In the storage configuration, the bracing system of the combination 250, and the first and second integrated seating portions (270, 302) are confined within corresponding seating confinement compartments (262, 290). As shown by FIGS. 7B and 7C, by unfolding the corresponding tabletop portions (256, 284), the corresponding retractable leg supports (264, 300) and the corresponding integrated seating portions (270, 302) are exposed for retraction from their corresponding seating confinement compartments (262, 290), as shown by FIG. 7D.

Figure 7E:
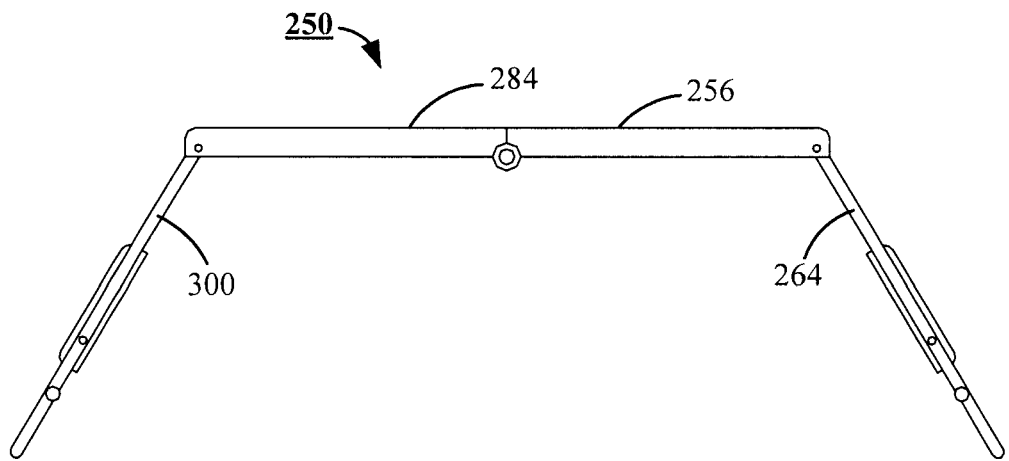
FIG. 7E provides a side elevational view of the alternative preferred embodiment of the inventive combination of FIG. 6 in a fourth opening mode.
Figure 7F:
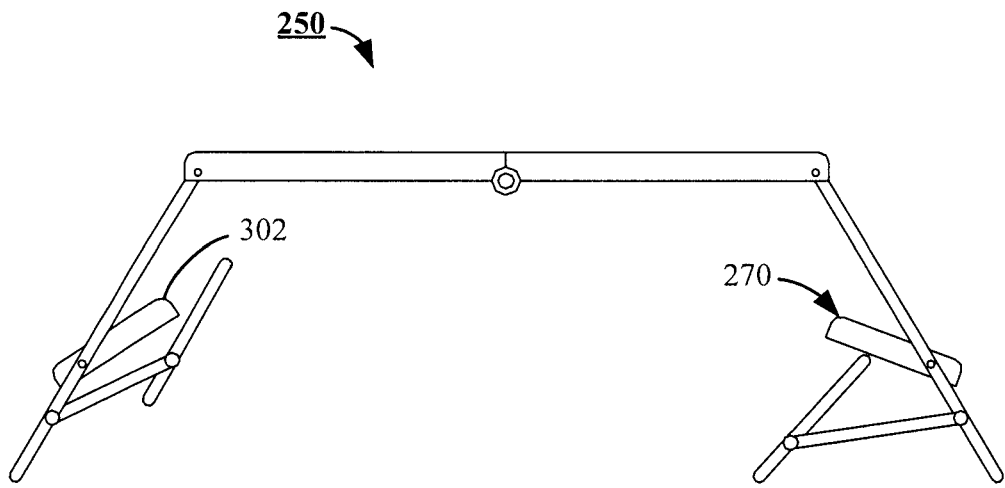
FIG. 7F provides a side elevational view of the alternative preferred embodiment of the inventive combination of FIG. 6 in a fifth opening mode.
Figure 7G:
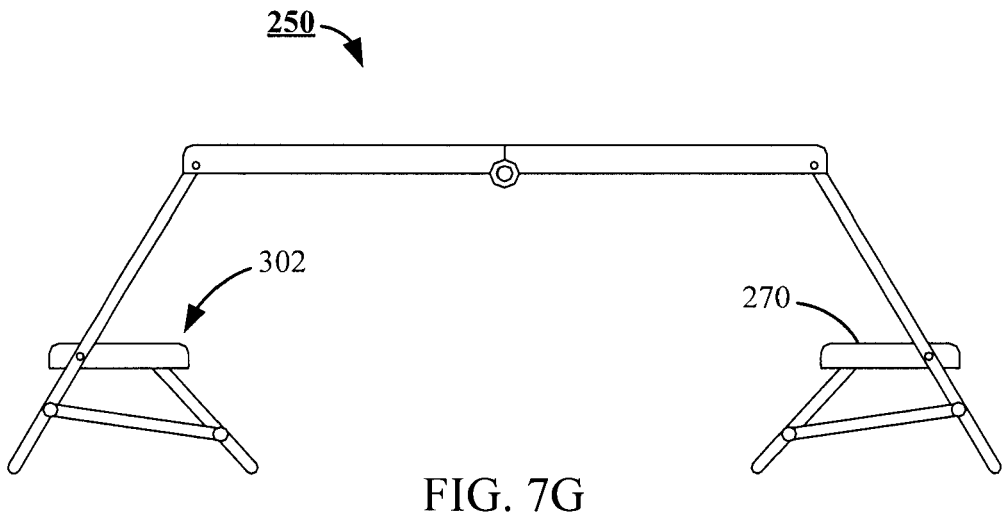
FIG. 7G provides a side elevational view of the alternative preferred embodiment of the inventive combination of FIG. 6 in a final opened mode.

Also shown by FIG. 7E, by positioning the corresponding first and second retractable leg supports (264, 300), the corresponding tabletop portions (256, 284) are positioned for use. FIGS. 7F-7G illustrate a sequence of steps useful for setting up the first and second integrated seating portions (270, 302) for use.

Figure 8:
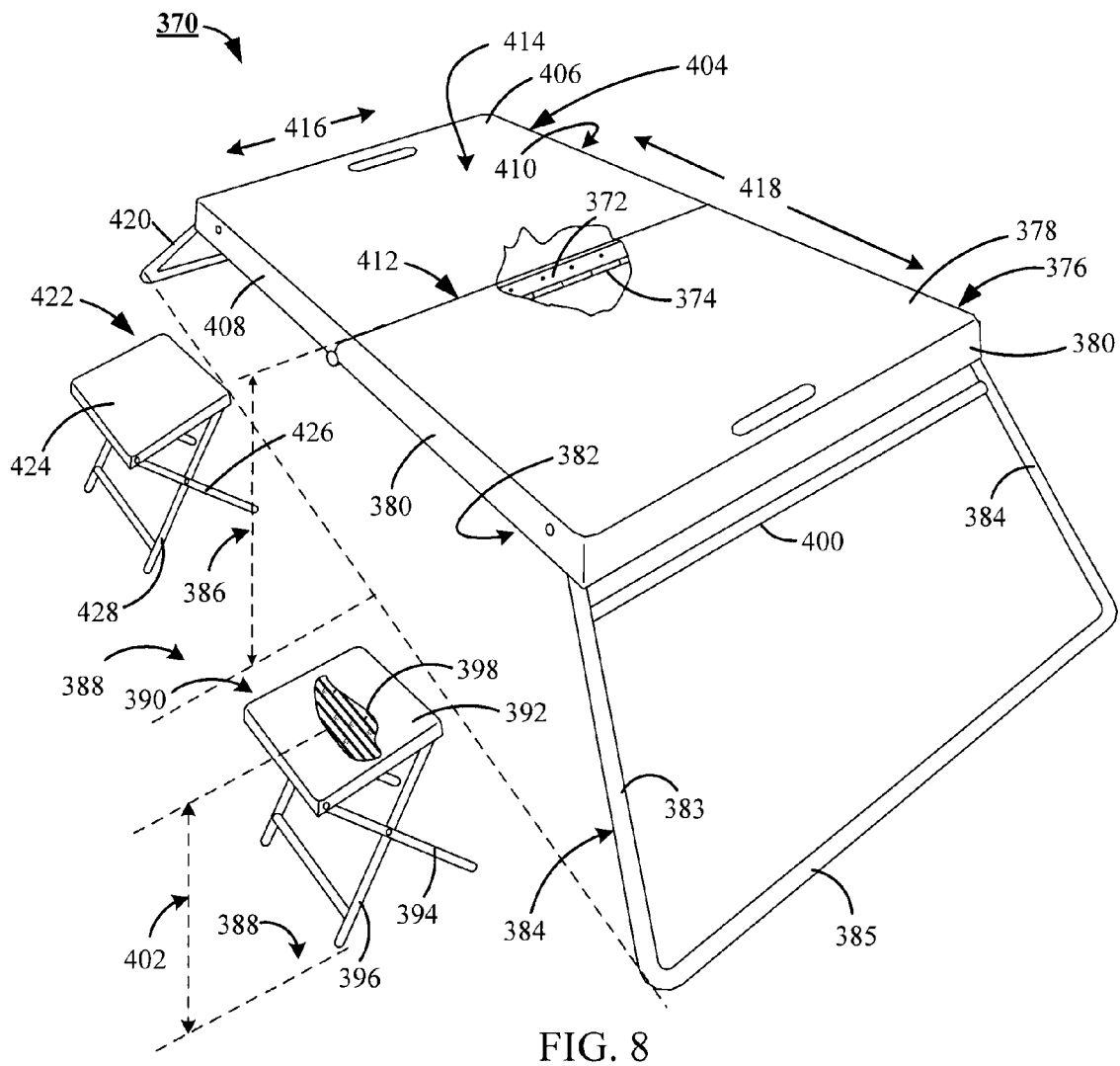
FIG. 8 provides a top side perspective view of an optionally preferred embodiment of the present inventive portable table and seat combination.

FIG. 8 shows an optionally preferred embodiment of a present inventive portable table and seat combination 370, which includes at least: a first portion 372 of a hinge 374 secured to a first tabletop portion 376. The first tabletop portion 376 includes at least a top surface 378, and a plurality of edge portions 380. The plurality of the edge portions 380 in combination with the top surface 378 defines and forms a first seating confinement compartment 382.

Further shown by FIG. 8 is a first retractable leg support 384 attached to the first tabletop portion 376. The leg support 384 includes a vertical support portion 383 and a horizontal stabilization bar 385. In an extended position, as shown by FIG. 8, the first retractable leg support 384 supports the first tabletop portion 376 a predetermined distance 386 above a surface 388. FIG. 8 also shows a first freestanding seating portion 390 configured for confinement within the first seating confinement compartment 382. Preferably, the first freestanding seating portion 390 includes at least a seating section 392 supported by a first seat support leg 394, and a first seating section support brace 396.

In a preferred embodiment, the first freestanding seating portion 390 and the first tabletop portion 376 are each formed from an ultraviolet light (UV) tolerant polymer. However, other materials such as fiberglass encapsulated in a UV tolerant resin, carbon fiber composites, and aluminum have been shown to be useful materials for both the first freestanding seating portion 390 and the first tabletop portion 376. It is noted that the list of materials identified as material suitable for use in forming the first freestanding seating portion 390 in the first tabletop portion 376 is only an exemplary list, and does not impose any limitations on the present invention. Those skilled in the art will recognize other materials suitable for use in forming the seating portion and the first tabletop portion 376.

Preferably, aluminum tubing is used in forming the bracing system of the present inventive portable table and seat combination 370. However, other materials found useful in forming the bracing system of the present inventive portable table and seat combination 370 includes at least: aluminum channeling; carbon fiber rods; and fiberglass rods. It is also noted that the list of materials identified as material suitable for use in forming the bracing system of the present inventive portable table and seat combination 370 is only an exemplary list, and does not impose any limitations on the present invention. Those skilled in the art will recognize other materials suitable for use.

When forming the first freestanding seating portion 390 from among the materials identified hereinabove, the inclusion of a plurality of support ribs 398 has been found useful. The inclusion of the plurality of support ribs 398 mitigate an amount of sagging experienced by the first freestanding seating portion 390 during use by an individuals. It has also been found useful to include a plurality of stabilization bars 400. A first of the plurality of stabilization bars 400 is attached between corresponding first retractable leg supports 384.

As shown by FIG. 8, the first freestanding seating portion 390 is configured into a support configuration. When configured into the support configuration, the first seat support leg 394 maintains the seating section 392 a second predetermined distance 402 from and substantially parallel with the surface 388 to accommodate and support seating of an individual upon the seating section 392.

The inventive portable table and seat combination 370 of FIG. 8, further includes at least: a second portion (not shown separately) of the hinge 374 secured to a second tabletop portion 404. The second tabletop portion 404 includes at least a top surface 406, and a plurality of the edge portions 408. The plurality of the edge portions 408 in combination with the top surface 406 defines and forms a second seating confinement compartment 410. Upon attachment of the hinge 374 to each the first and second tabletop portions (376, 404) a hinged joint 412 between the first and second tabletop portions (376, 404) is formed and a tabletop 414 is defined, wherein the defined tabletop 414 comprises a width 416 and a length 418.

Continuing with FIG. 8, shown therein is a second retractable leg support 420 attached to the second tabletop portion 404. In an extended position, as shown by FIG. 8, the second retractable leg support 420 supports the second tabletop portion 404 the predetermined distance 386 above the surface 388. FIG. 8 also shows a second freestanding seating portion 422 configured for confinement within the second seating confinement compartment 410. Preferably, the second freestanding seating portion 422 includes at least: a second seating section 424 supported by a second seat support leg 426; and a second seating section support brace 428.

Figures 9A, 9B:
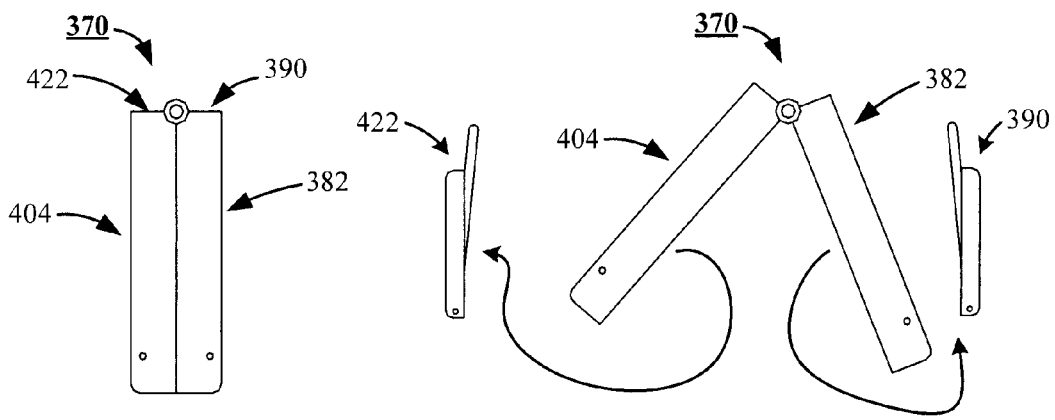
FIG. 9A provides a side elevational view of the optionally preferred embodiment of the inventive combination of FIG. 8 in a retracted mode.
FIG. 9B provides a side elevational view of the optionally preferred embodiment of the inventive combination of FIG. 8 in a first opening mode.
Figure 9C:
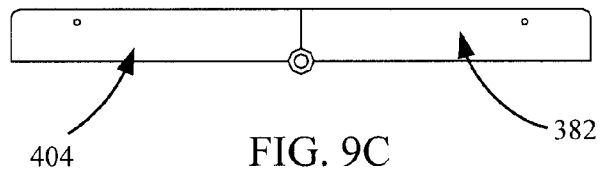
FIG. 9C provides a side elevational view of the optionally preferred embodiment of the inventive combination of FIG. 8 in a second opening mode.

Turning to FIGS. 9A-9E, shown therein are drawings depicting a sequence of steps for setting up the inventive portable table and seat combination 370 of FIG. 8 for use. FIG. 9A shows the combination 370 in a storage configuration. In the storage configuration the first and second freestanding seating portions (390, 422) are confined within corresponding seating confinement compartments (382, 410). As shown by FIGS. 9B and 9C, by unfolding, i.e. rotating, the corresponding first and second seating confinement compartments (382, 410) relative to the hinged joint 412 (of FIG. 8), the corresponding freestanding seating portions (390, 422) are exposed for retraction from their corresponding seating confinement compartments (382, 410), as shown by FIG. 9B.

Figure 9D:
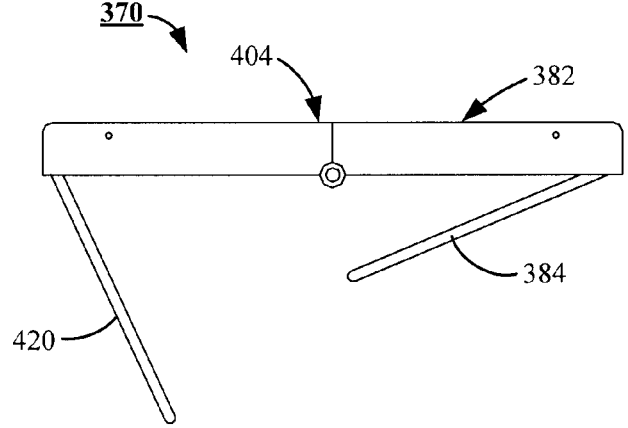
FIG. 9D provides a side elevational view of the optionally preferred embodiment of the inventive combination of FIG. 8 in a third opening mode.
Figure 9E:
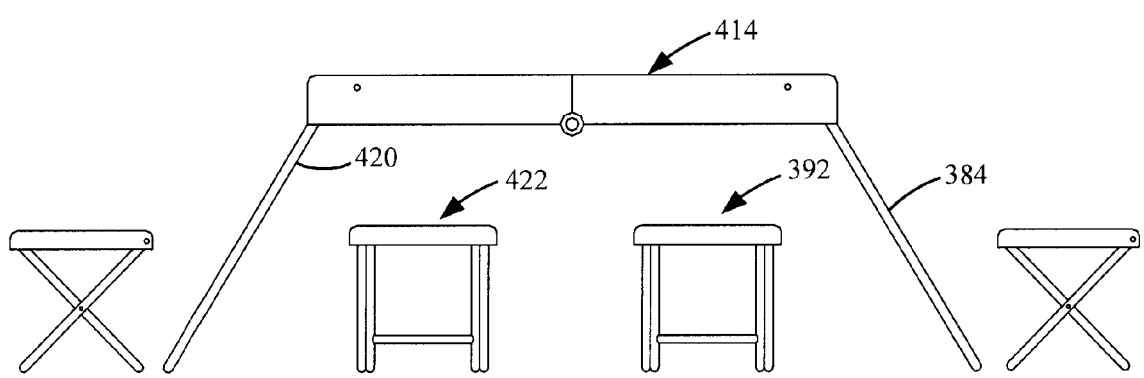
FIG. 9E provides a side elevational view of the optionally preferred embodiment of the inventive combination of FIG. 8 in a final opened mode.

As shown by FIG. 9C, by fully extending the corresponding tabletop portions (376, 404), the corresponding first and second retractable leg supports (384, 420) are free to rotate in a downwardly manner, as shown by FIG. 9D. As shown by FIG. 9E, the downwardly rotation of the corresponding first and second retractable leg supports (384, 420) culminates with the formation of the tabletop 414 of FIG. 9E.

Figure 10A:
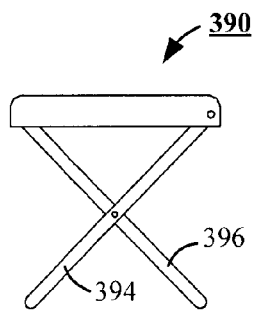
FIG. 10A provides an elevational view of a freestanding seating portion in a final open mode and configured for confinement within a seating confinement compartment of the present inventive combination.
Figure 10B:
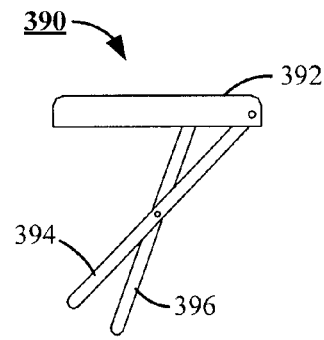
FIG. 10B provides a side elevational view of the freestanding seating portion of FIG. 10A in a partially open mode.
Figure 10C:
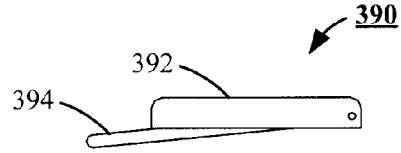
FIG. 10C provides a side elevational view of the freestanding seating portion of FIG. 10A in a fully collapsed mode.

Turning to FIGS. 10A-10C, shown therein are drawings depicting a sequence of folding up the first freestanding seating portion 390 of FIG. 8 for storage. FIG. 10A shows the first freestanding seating portion 390 ready for use. As shown by FIG. 10B, by removing the first seating section support brace 396 from support of the seating section 392, the first seating section support brace 396 is swung into alignment with the first seat support leg 394. FIG. 10C shows the first freestanding seating portion 390 in a collapsed form and ready for storage.

Figure 11:
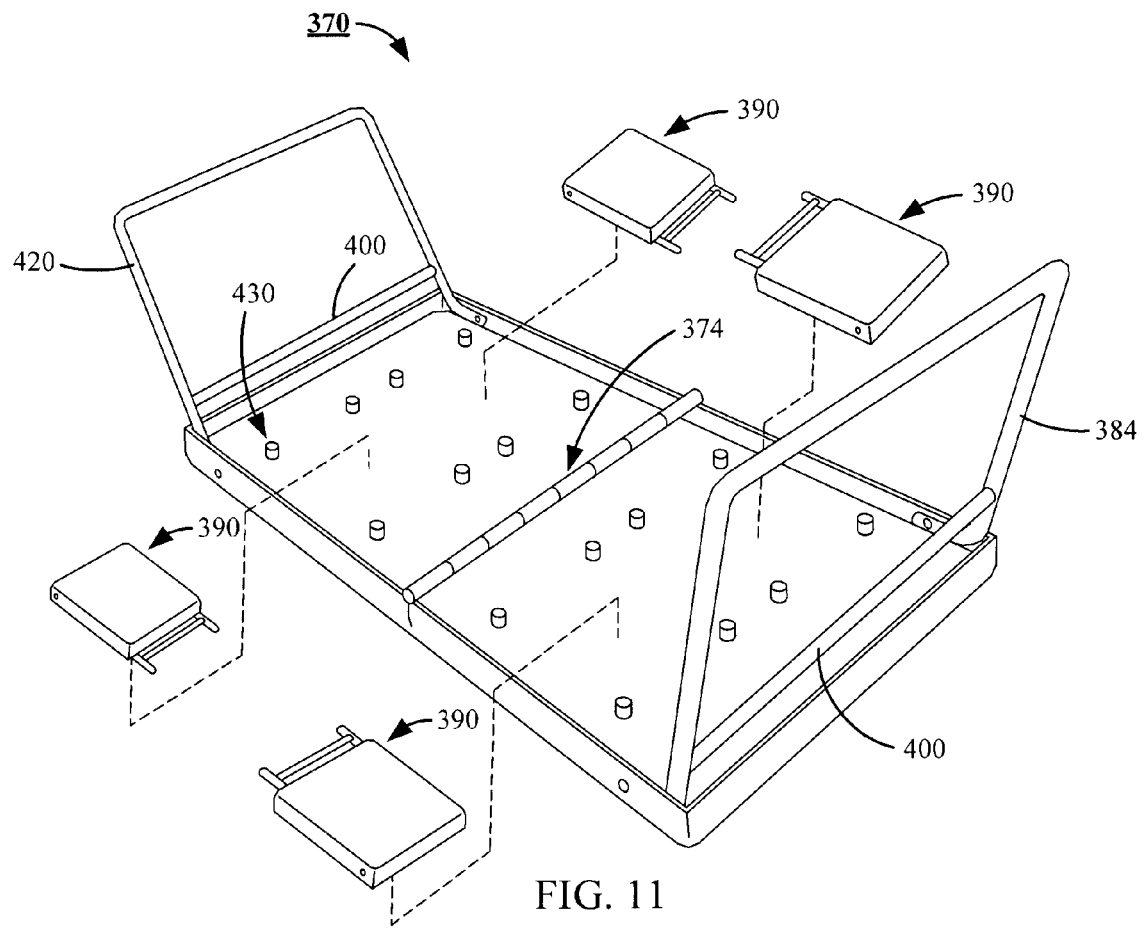
FIG. 11 provides a bottom side perspective view of the optionally preferred embodiment of the inventive portable table and seat combination of FIG. 8.

FIG. 11 shows a bottom side perspective view of the optionally preferred embodiment of the inventive portable table and seat combination 370 of FIG. 8. Included in FIG. 11 is a plurality of seating portion confinement members 430, configured into groups of four. Each group of four seating portion confinement members 430 preferably mitigates both transverse and lateral motion of each freestanding seating portion 390 during transport and storage of the combination 370. It is also noted that when the corresponding first and second retractable leg supports (384, 420) are folded into their retracted positions, the stabilization bars 400 of the corresponding first and second retractable leg supports (384, 420) confine each first freestanding seating portion 390 within their corresponding seating portion confinement members 430.

Figure 12:
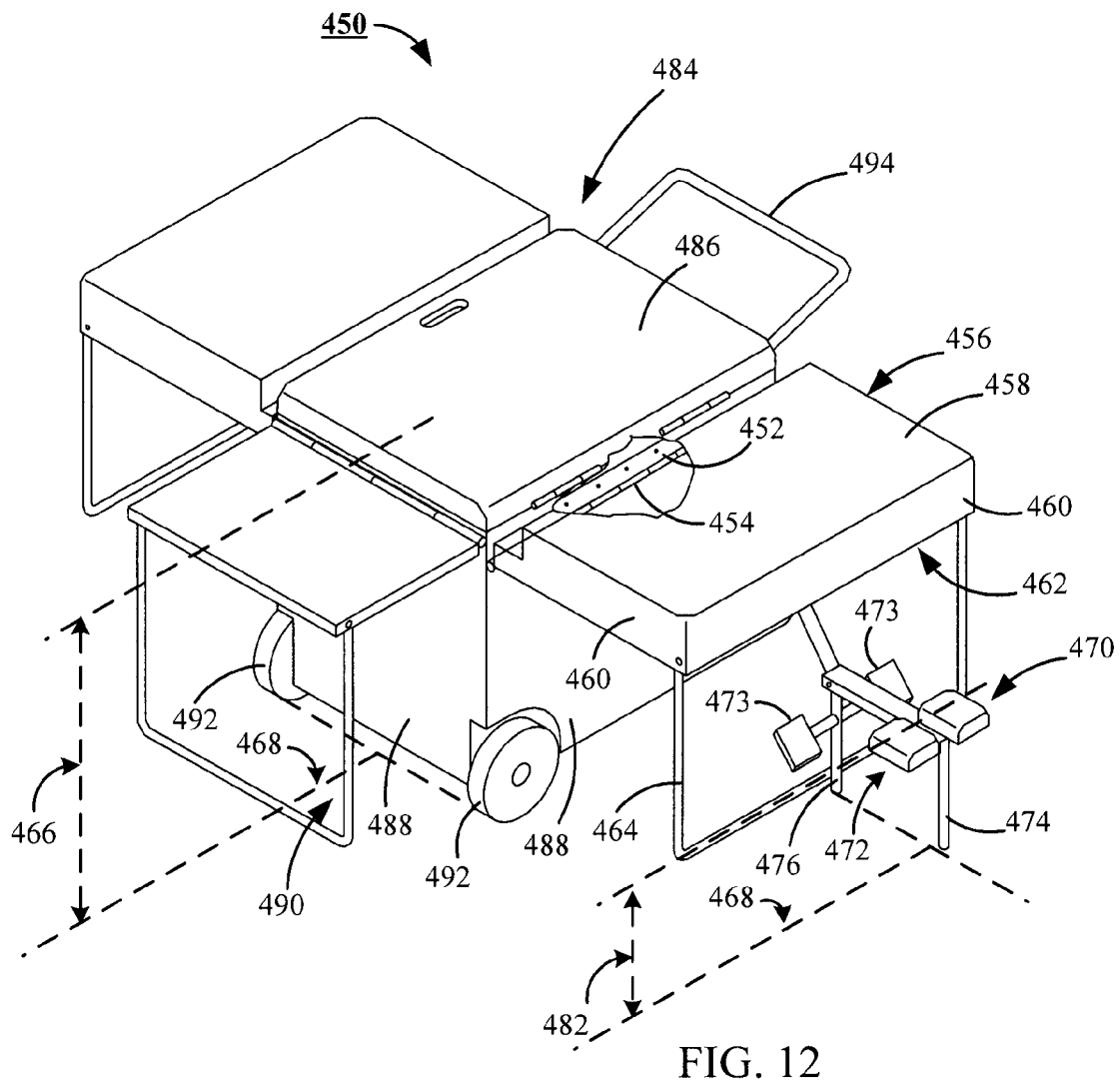
FIG. 12 provides a top side perspective view of an electively preferred embodiment of the present inventive portable table and seat combination.

FIG. 12 shows an electively preferred embodiment of the present inventive portable table and seat combination 450, which includes at least: a first portion 452 of a hinge 454 secured to a first tabletop portion 456. The first tabletop portion 456 includes at least a top surface 458, and a plurality of edge portions 460. The plurality of the edge portions 460 in combination with the top surface 458 defines and forms a first seating confinement compartment 462.

Further shown by FIG. 12 is a first retractable leg support 464 attached to the first tabletop portion 456. In an extended position, as shown by FIG. 12, the first retractable leg support 464 supports the first tabletop portion 456 a predetermined distance 466 above a surface 468. FIG. 12 also shows a first integrated seating portion 470 configured for confinement within the first seating confinement compartment 462. Preferably, the first integrated seating portion 470 includes at least a seating section 472 supported by a first seat support leg 474, and a first seating section support brace 476.

In a preferred embodiment, the first integrated seating portion 470 and the first tabletop portion 456 are each formed from an ultraviolet light (UV) tolerant polymer. However, other materials such as fiberglass encapsulated in a UV tolerant resin, carbon fiber composites, and aluminum have been shown to be useful materials for both the first integrated seating portion 470 and the first tabletop portion 456. Preferably, the seating section 472 provides a bolster cushion of material such as polyurethane, for added comfort, and is preferably covered with a weather tolerant polymer covering. Also preferably, the seating section is of a split type and includes a pair of shin supports 473. The construction of the seating section 472, with its accompanying shin supports 473, promotes a correct posture and relieves pressure from a user's back. It is noted that the list of materials identified as material suitable for use in forming the first integrated seating portion 470 in a first tabletop portion 456 is only an exemplary list, and does not impose any limitations on the present invention. Those skilled in the art will recognize other materials suitable for use in forming the seating portion and the first tabletop portion 456.

Preferably, aluminum tubing is used in forming the bracing system of the present inventive portable table and seat combination 450. However, other materials found useful in forming the bracing system of the present inventive portable table and seat combination 450 includes at least: aluminum channeling; carbon fiber rods; and fiberglass rods. It is also noted that the list of materials identified as material suitable for use in forming the bracing system of the present inventive portable table and seat combination 450 is only an exemplary list, and does not impose any limitations on the present invention. Those skilled in the art will recognize other materials suitable for use.

As shown by FIG. 12, the first integrated seating portion 470 is configured in a support configuration. When configured into the support configuration, the first seat support leg 474 maintains the seating section 472 a second predetermined distance 482 from and substantially parallel with the surface 468 to accommodate and support seating of an individual upon the seating section 472.

The inventive portable table and seat combination 450 of FIG. 12, further includes at least: a second portion (not shown separately) of the hinge 454 secured to a portable cooler 484. The portable cooler 484 includes at least a hinged lid 486, and a plurality of side portions 488. The plurality of the side portions 488 in combination with the hinged lid 486 defines and forms a chest portion 490, which supports the hinged lid 486. The portable cooler 484 further includes a wheel 492 for supporting the chest portion 490 during transport of the chest portion 490, and a handle 494 secured to the chest portion 490 for maneuvering the chest portion during the transport of the chest portion 490.

Figure 13A:
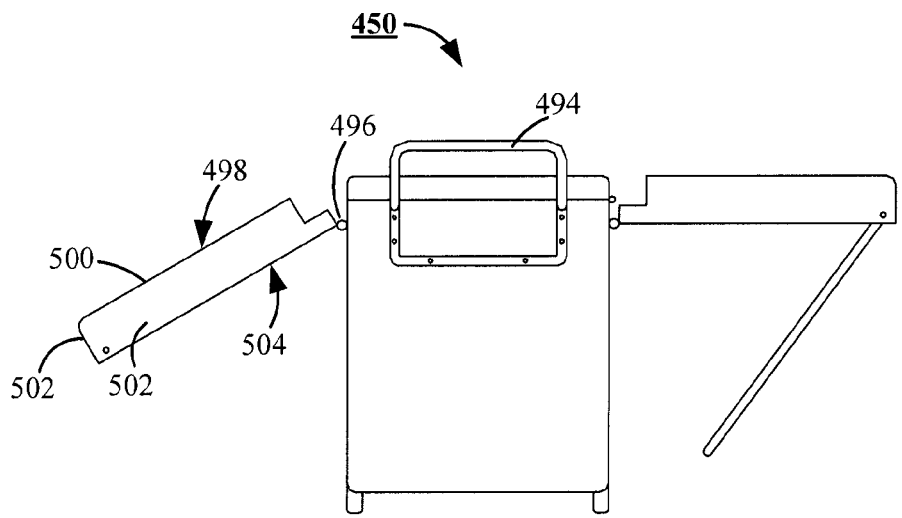
FIG. 13A provides a side elevational view of the electively preferred embodiment of the inventive combination of FIG. 12 in a first opening mode.

The inventive portable table and seat combination 450 of FIG. 13A, shows combination 450 further includes at least: a first portion (not shown separately) of a second hinge 496 secured to a portable cooler 484 and to a second tabletop portion 498. The second tabletop portion 498 includes at least a top surface 500, and a plurality of the edge portions 502. The plurality of the edge portions 502 in combination with the top surface 500 defines and forms a second seating confinement compartment 504.

Figure 13B:
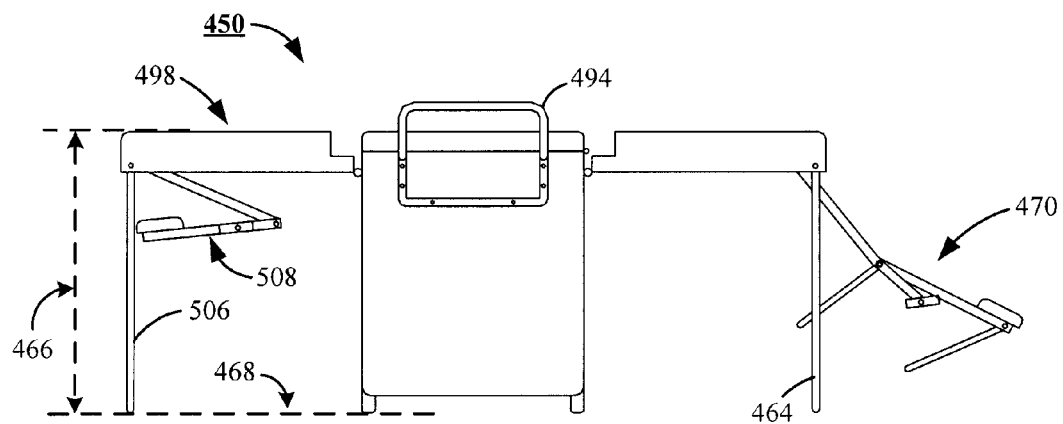
FIG. 13B provides a side elevational view of the electively preferred embodiment of the inventive combination of FIG. 12 in a second opening mode.
Figure 13C:
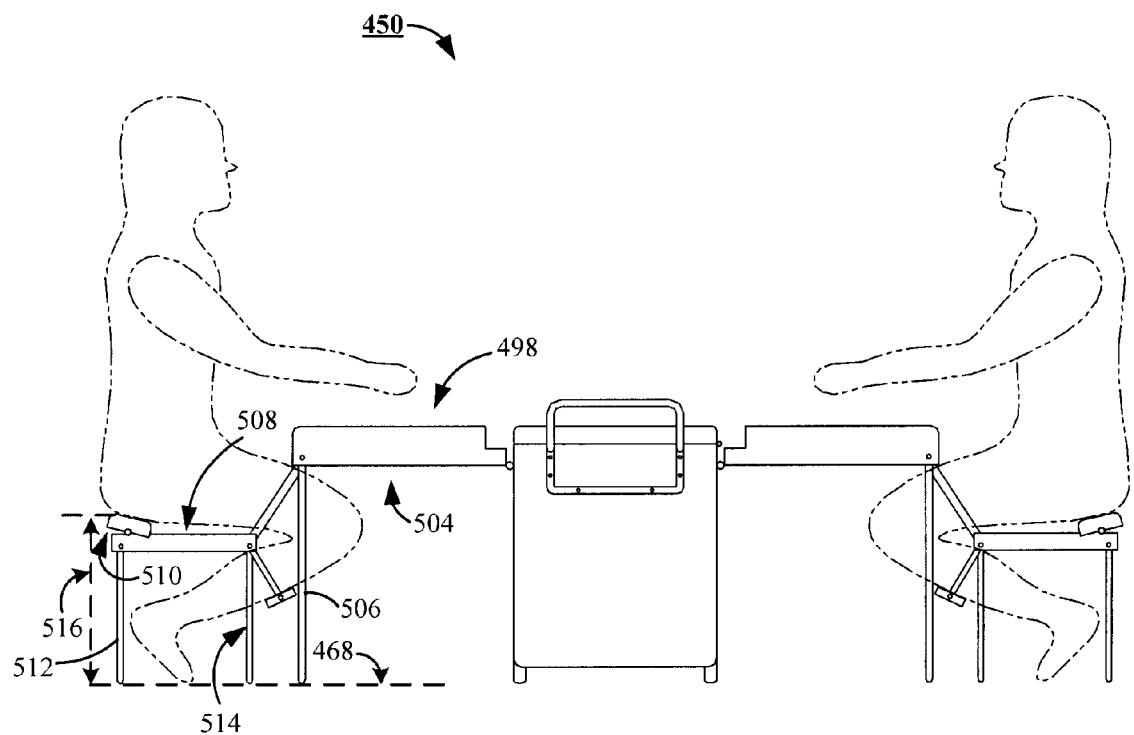
FIG. 13C provides a side elevational view of the electively preferred embodiment of the inventive combination of FIG. 12 in a final opened mode.

Continuing with FIG. 13B, shown therein is a second retractable leg support 506 attached to the second tabletop portion 498. In an extended position, as shown by FIG. 13B, the second retractable leg support 506 supports the second tabletop portion 498 the predetermined distance 466 above the surface 468. FIG. 13C shows a second integrated seating portion 508 configured for confinement within the second seating confinement compartment 504. Preferably, the second integrated seating portion 508 includes at least: a second seating section 510 supported by a second seat support leg 512; and a second seating section support brace 514, which collectively support an individual a second predetermined distance 516 of the surface 468.

Figure 14:
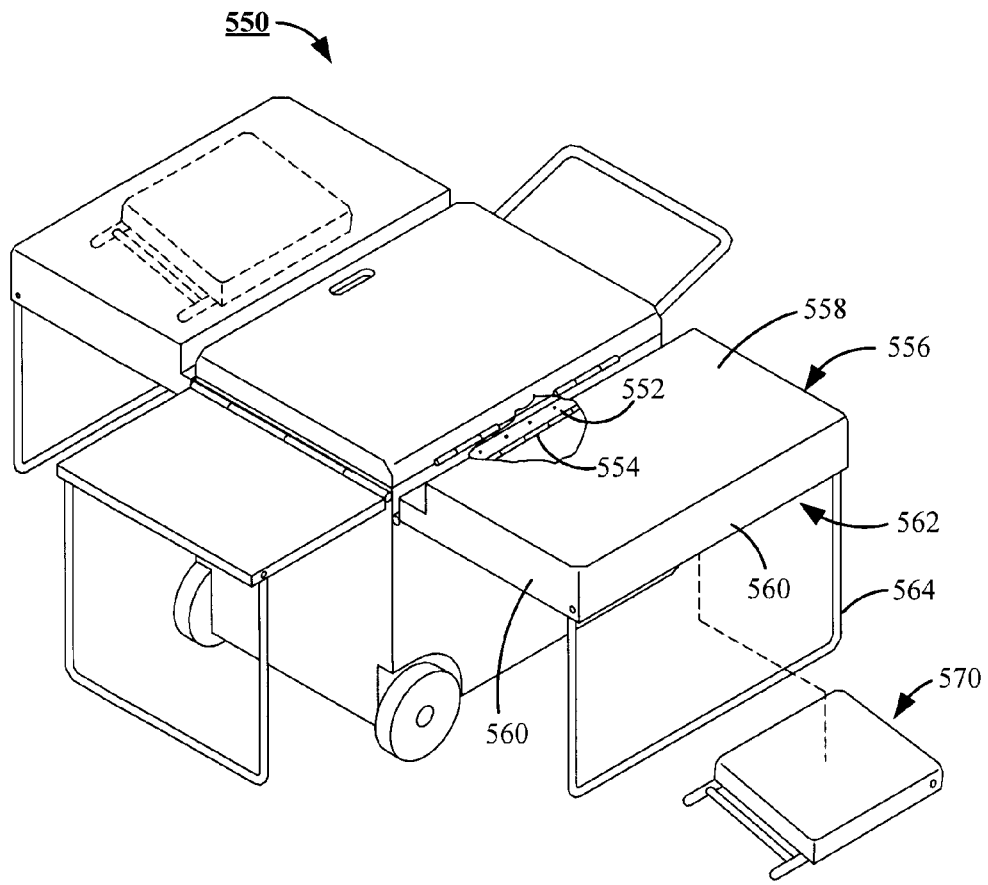
FIG. 14 provides a top side perspective view of an alternate electively preferred embodiment of the present inventive portable table and seat combination.

FIG. 14 shows an alternate electively preferred embodiment of the present inventive portable table and seat combination 550, which includes at least: a first portion 552 of a hinge 554 secured to a first tabletop portion 556. The first tabletop portion 456 includes at least a top surface 558, and a plurality of edge portions 560. The plurality of the edge portions 560 in combination with the top surface 558 defines and forms a first seating confinement compartment 562.

Figure 15:
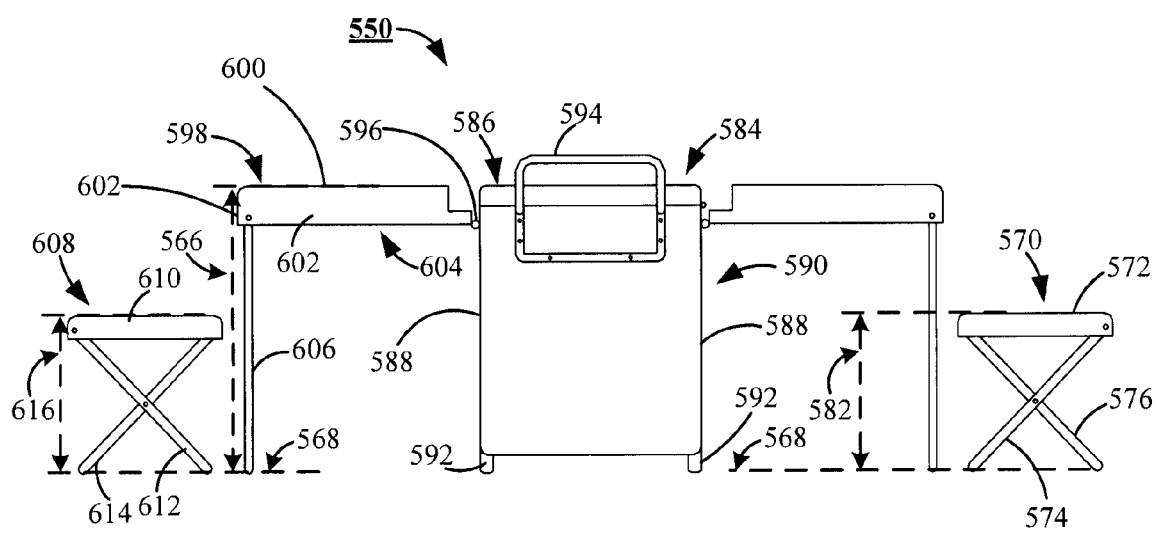
FIG. 15 provides a side elevational view of the alternate electively preferred embodiment of the inventive combination of FIG. 14 in a final opened mode.

Further shown by FIG. 14 is a first retractable leg support 564 attached to the first tabletop portion 556. In an extended position, as shown by FIG. 15, the first retractable leg support 564 supports the first tabletop portion 556 a predetermined distance 566 above a surface 568. Returning to FIG. 14, shown therein is a first freestanding seating portion 570 configured for confinement within the first seating confinement compartment 562. Again referencing FIG. 15, preferably, the first freestanding seating portion 570 includes at least a seating section 572 supported by a first seat support leg 574, and a first seating section support brace 576.

In a preferred embodiment, the first freestanding seating portion 570 and the first tabletop portion 556 are each formed from an ultraviolet light (UV) tolerant polymer. However, other materials such as fiberglass encapsulated in a UV tolerant resin, carbon fiber composites, and aluminum have been shown to be useful materials for both the first freestanding seating portion 570 and the first tabletop portion 556. Preferably, the seating section 572 provides a bolster cushion of material such as polyurethane, for added comfort, and covered with a weather tolerant polymer covering. Also preferably, the seating section is of a split type and includes a pair of shin supports 573. The construction of the seating section 572 with its accompanying shin supports 573 promotes a correct posture and relieves pressure from a user's back. It is noted that the list of materials identified as material suitable for use in forming the first freestanding seating portion 570 in a first tabletop portion 556 is only an exemplary list, and does not impose any limitations on the present invention. Those skilled in the art will recognize other materials suitable for use in forming the seating portion and the first tabletop portion 456.

Preferably, aluminum tubing is used in forming the bracing system of the present inventive portable table and seat combination 550. However, other materials found useful in forming the bracing system of the present inventive portable table and seat combination 550 includes at least: aluminum channeling; carbon fiber rods; and fiberglass rods. It is also noted that the list of materials identified as material suitable for use in forming the bracing system of the present inventive portable table and seat combination 550 is only an exemplary list, and does not impose any limitations on the present invention. Those skilled in the art will recognize other materials suitable for use.

As shown by FIG. 15, the first freestanding seating portion 570 is configured into a support configuration. When configured into the support configuration, the first seat support leg 574 maintains the seating section 572, at a second predetermined distance 582 from and substantially parallel with the surface 568 to accommodate and support seating of an individual upon the seating section 572.

The inventive portable table and seat combination 450 of FIG. 15, further includes at least: a second portion (not shown separately) of the hinge 554 secured to a portable cooler 584. The portable cooler 584 includes at least a hinged lid 586, and a plurality of side portions 588. The plurality of the side portions 588 in combination with the hinged lid 586 defines and forms a chest portion 590 supporting the hinged lid 586.

The portable cooler 584 further includes a wheel 592 supporting the chest portion 590 during transport of the chest portion 590, and a handle 594 secured to the chest portion 590 for maneuvering the chest portion 590 during the transport of the chest portion 490.

The inventive portable table and seat combination 450 of FIG. 15, shows that combination 450 further includes at least: a first portion (not shown separately) of a second hinge 696 secured to the portable cooler 584 and to a second tabletop portion 598, which includes at least a top surface 600, and a plurality of the edge portions 506. The plurality of the edge portions 602 in combination with the top surface 600 defines and forms a second seating confinement compartment 604.

Continuing with FIG. 15, shown therein is a second retractable leg support 606 attached to the second tabletop portion 598. In an extended position, as shown by FIG. 15, the second retractable leg support 606 supports the second tabletop portion 598 the predetermined distance 566 above the surface 668. FIG. 15 shows a second freestanding seating portion 608 configured for confinement within the second seating confinement compartment 604. Preferably, the second freestanding seating portion 608 includes at least: a second seating section 610 supported by a second seat support leg 612; and a second seating section support brace 614, which collectively support an individual a second predetermined distance 616 of the surface 568.

Figure 16:
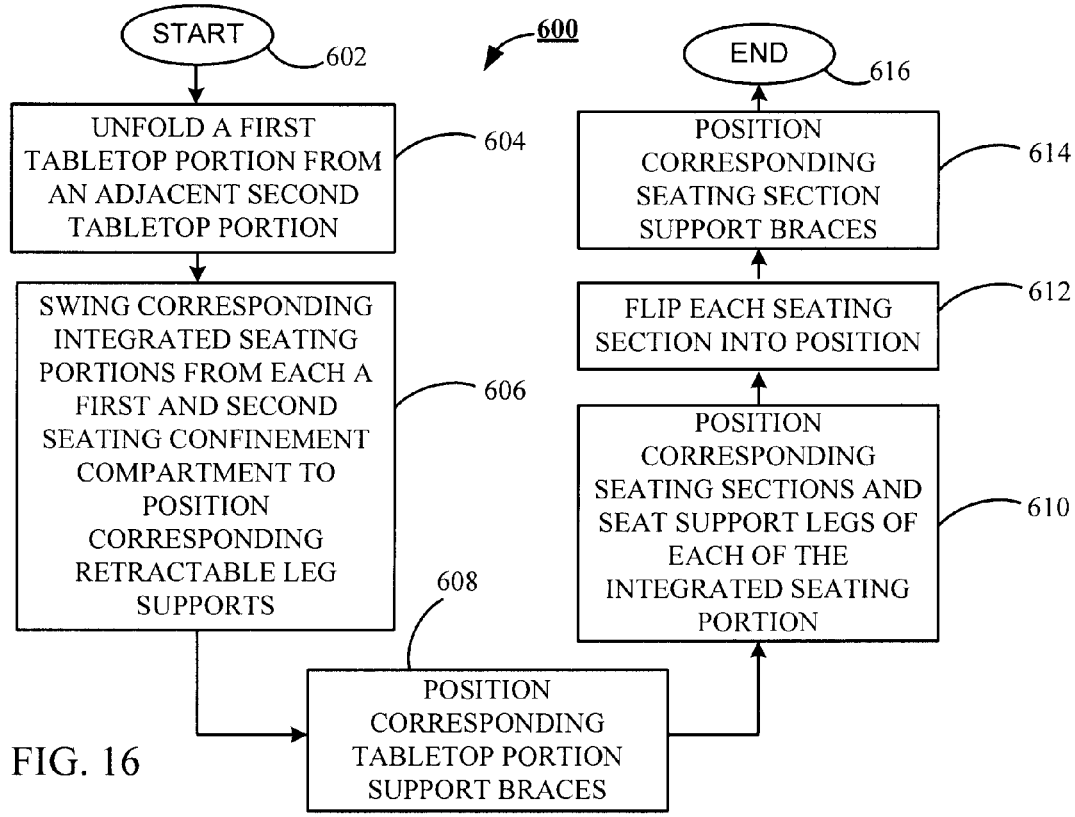
FIG. 16 provides a flow chart of a method of setting up for use the inventive portable table and seat combination of FIG. 1.

FIG. 16 shows a method 600 of setting up for use an inventive portable table and seat combination, such as 100 of FIG. 1. The method commences at start process step 602, and continues with process step 604. At process step 604, a first and second tabletop portions, such as (106, 134), are provided, and wherein the first tabletop portion is unfolded from the adjacent second tabletop portion.

At process step 606, corresponding integrated seating portions, such as (120, 152) are swung from each a first and second seating confinement compartments, such as (112, 140) to position corresponding retractable leg supports (124, 156).

At process step 608, corresponding tabletop portion support braces, such as 160, are positioned into place. At process step 610, are corresponding seating sections, such as (122, 154) and seat support legs (124, 156) of each respective integrated seating portions are positioned into place. At process step 612, each seating section is flipped into its final position. Continuing at process step 614, the corresponding seating section support braces are positioned into place, and the method concludes at end process step 616.

Figure 17:
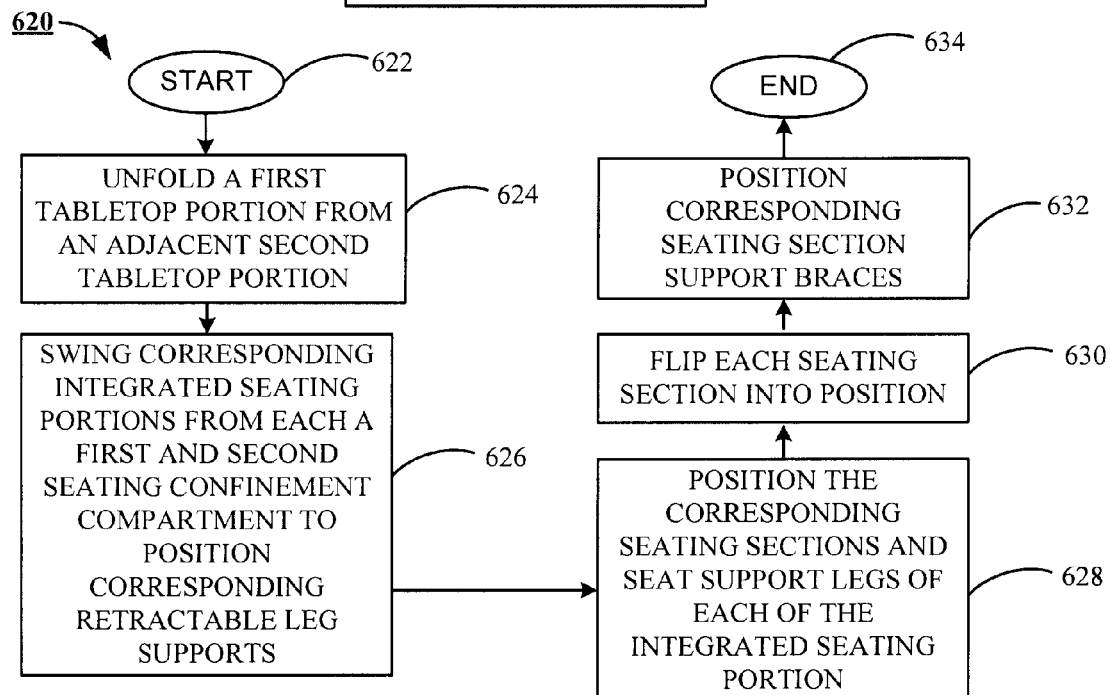
FIG. 17 provides a flow chart of a method of setting up for use the inventive portable table and seat combination of FIG. 6.

FIG. 17 shows a method 620 of setting up for use an alternative preferred embodiment of the present inventive portable table and seat combination, such as 250 of FIG. 6. The method commences at start process step 622, and continues with process step 624. At process step 624, a first and second tabletop portions, such as (256, 284), are provided, and wherein the first tabletop portion is unfolded from the adjacent second tabletop portion.

At process step 626, corresponding integrated seating portions, such as (270, 302) are swung from each a first and second seating confinement compartments, such as (262, 290) to position corresponding retractable leg supports, such as (264, 300). At process step 628, are corresponding seating sections (272, 304) and seat support legs, such as (274, 306) of each respective integrated seating portions are positioned into place.

At process step 630, each seating section is flipped into its final position. Continuing at process step 632, the corresponding seating section support braces are positioned, and the method concludes at end process step 634.

Figure 18:
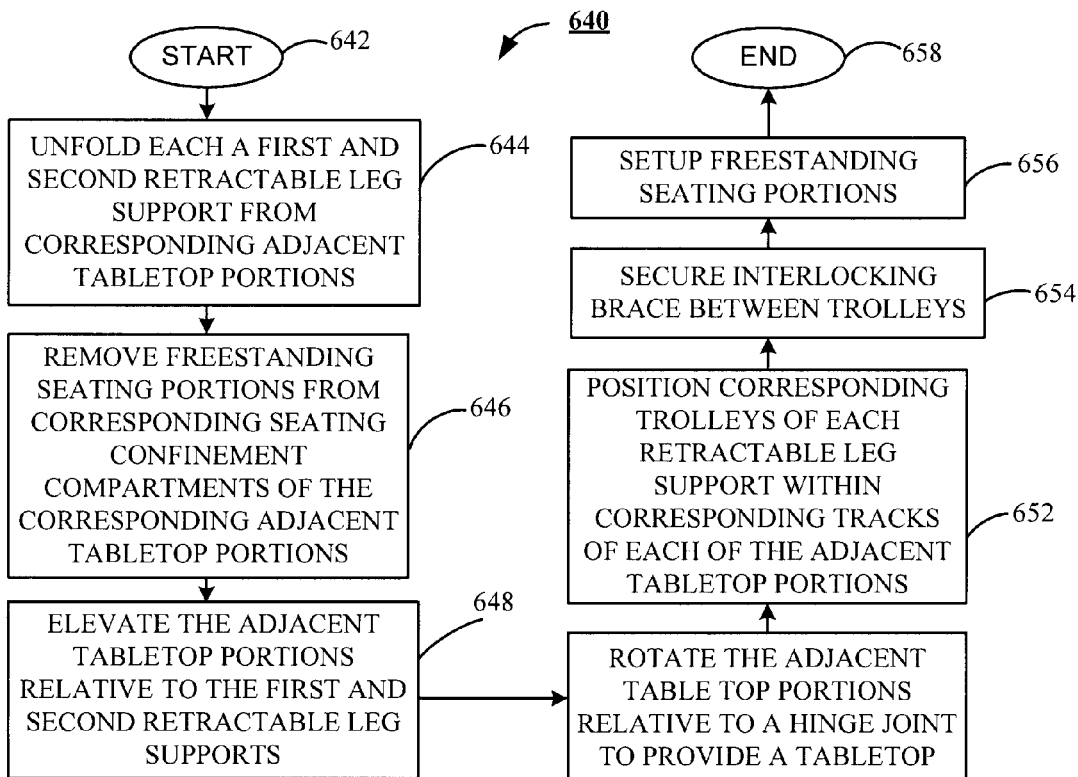
FIG. 18 provides a flow chart of a method of setting up for use the inventive portable table and seat combination of FIG. 3.

FIG. 18 shows a method 640 of setting up for use an alternate preferred embodiment of the present inventive portable table and seat combination, such as 170 of FIG. 3. The method commences at start process step 642, and continues with process step 644.

At process step 644, a first and second retractable leg support, such as (184, 220), are provided, and wherein each of the retractable leg supports are unfolded from their respective adjacent tabletop portions, such as (176, 204).

At process step 646, freestanding seating portions (190, 222) are removed from each respective seating confinement compartments (182, 210) of each of the corresponding tabletop portions.

At process step 648, the adjacent tabletop portions are elevated relative to the first and second retractable leg supports.

At process step 650, the adjacent tabletop portions, and the corresponding seating confinement compartments, are rotated relative to a hinged joint, such as 212, to provide a tabletop, such as 214.

At process step 652, each corresponding track trolley, such as (236, 238), of each retractable leg support are positioned within its corresponding trolley tracks, such as (232, 234), of each of the adjacent tabletop portions.

At process step 654, an interlocking brace, such as 230, is secured between each track trolley.

Continuing at process step 656, the freestanding seating portions are respectively setup, and the method concludes at end process step 658.

Figure 19:
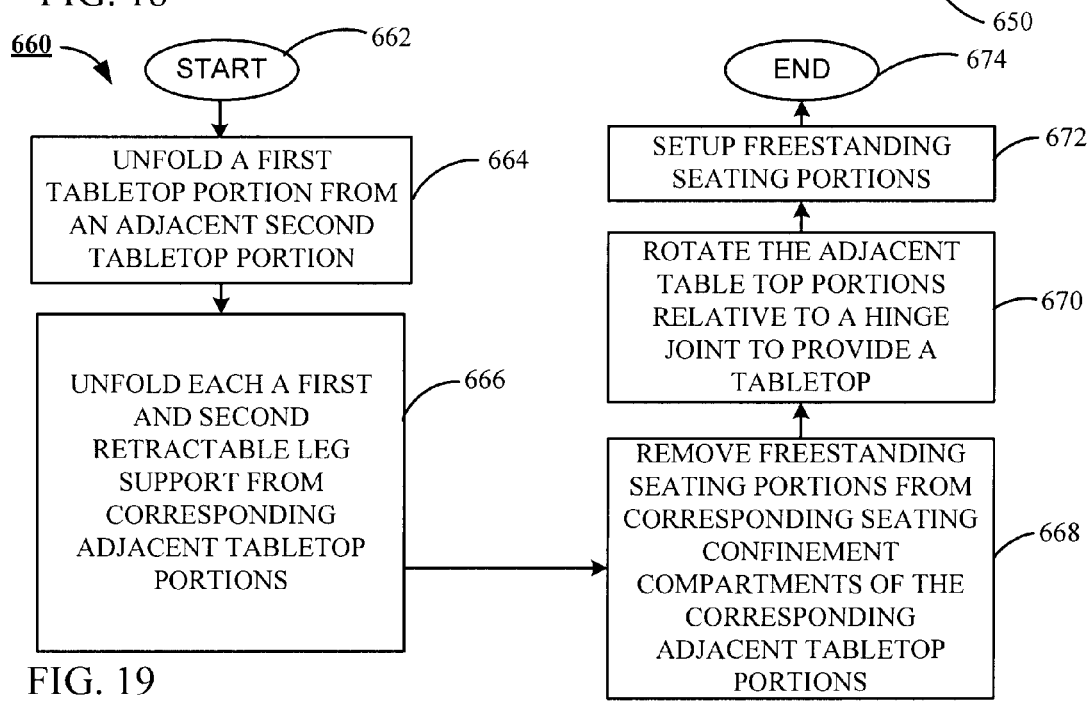
FIG. 19 provides a flow chart of a method of setting up for use the inventive portable table and seat combination of FIG. 8.

FIG. 19 shows a method 660 of setting up for use an optionally preferred embodiment of the present inventive portable table and seat combination, such as 370 of FIG. 8. The method commences at start process step 662, and continues with process step 664. At process step 664, a first and second tabletop portions, such as (376, 404), are provided, and wherein the first tabletop portion is unfolded from the adjacent second tabletop portion.

At process step 666, a first and second retractable leg support, such as (384, 420), are provided, and wherein each of the retractable leg supports are unfolded from its respective adjacent tabletop portions, such as (376, 404).

At process step 668, freestanding seating portions (390, 422) are removed from their respective seating confinement compartments, such as (382, 410), of each of the corresponding tabletop portions.

At process step 670, the adjacent tabletop portions, and the corresponding seating confinement compartments, are rotated relative to a hinge joint, such as 412 to provide a tabletop.

Continuing at process step 672, the freestanding seating portions are respectively setup, and the method concludes at end process step 674.

FIG. 20 shows a method 680 of setting up for use an electively preferred embodiment of the present inventive portable table and seat combination, such as 450 of FIG. 12. The method commences at start process step 682, and continues with process step 684. At process step 684, a first tabletop portion, such as 456, is provided, and wherein the first tabletop portion is unfolded from a portable cooler, such as 484.

At process step 686, a first retractable leg support, such as 464, is positioned.

At process step 688, a first integrated seating portion, such as 470, is swung from a first seating confinement compartment, such as 462, of the first tabletop portion, to position a first seat support leg, such as 474.

At process step 690, a first and second seating section support braces, such as (476, 514), are positioned from the first integrated seating portion.

At process step 692, a second tabletop portion, such as 498, is provided, and wherein the second tabletop portion is unfolded from the portable cooler.

At process step 694, a second retractable leg support, such as 506, is positioned.

At process step 696, a second integrated seating portion, such as 508, is swung from a second seating confinement compartment, such as 504, of the second table portion, such as 498, to position a second seat support leg, such as 512.

Continuing at process step 698, a first and second seating section support braces, such as (476, 514), are positioned from the second integrated seating portion and the method concludes at end process step 700.

FIG. 21 shows a method 710 of setting up for use an alternate electively preferred embodiment of the present inventive portable table and seat combination, such as 550 of FIG. 14. The method commences at start process step 712, and continues with process step 714. At process step 714, a first tabletop portion, such as 556, is provided, and wherein the first tabletop portion is unfolded from a portable cooler, such as 584.

At process step 716, a first freestanding seating portion, such as 570, is removed from its respective seating confinement compartment, such as 562, of the first tabletop portion.

At process step 718, a first retractable leg support, such as 564, is provided, and wherein the retractable leg support is unfolded from a seating confinement compartment of the first tabletop portion.

At process step 720, a second tabletop portion, such as 598, is provided, and wherein the second tabletop portion is unfolded from the portable cooler, such as 584.

At process step 722, a second freestanding seating portion, such as 608, is removed from its respective seating confinement compartment, such as 604, of the second tabletop portion.

At process step 724, a second retractable leg support, such as 606, is provided, and wherein the retractable leg support is unfolded from a seating confinement compartment of the second tabletop portion.

Continuing at process step 726, the freestanding seating portions are respectively setup, and the method concludes at end process step 728.

Thus, the present invention is well adapted to carry out the advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A portable table and seating combination comprising:
   a first portion of a hinge communicating with a first tabletop portion, the first tabletop portion comprising:
   a first top surface;
   a plurality of edge portions extending from the first top surface, wherein the first top surface in combination with the plurality of edge portions combine to form a seating confinement compartment;
   a retractable leg support attached adjacent a selected edge portion of the plurality of edge portions;
   a seating portion support brace secured to the retractable leg support;
   a seating portion supported by the seating portion support brace and adjacent the tabletop;

a second portion of the hinge communicating with a second tabletop portion, the second tabletop portion comprising a second top surface, wherein the seating portion including at least a seating section supported by a seat support leg which collectively support the individual a first predetermined distance above a surface, in which the seating section includes a plurality of independent support ribs, wherein each of the plurality of independent support ribs is in non-contacting adjacency with the remaining independent support ribs to mitigate sagging when said seating portion is in use, and further wherein said plurality of independent support ribs are perpendicular to a width of the seating section, wherein the retractable leg support includes a vertical support portion extending from the tabletop to the surface, and a plurality of stabilization bars supporting the vertical support portion, each stabilization bar parallel to a selected edge portion of the plurality of edge portions, and extending in length a distance of substantially the entire length of the selected edge portion, and wherein the length of each said stabilization bars is hinge free; and a hinged joint between the first and second tabletop portions is formed and a tabletop is defined upon attachment of the hinge to each of the first and second tabletop portions, wherein the seating confinement compartment is rotated relative to the hinged joint to provide the tabletop, wherein in a retracted position the retractable leg support resides adjacent the seating confinement compartment, and further wherein in an extended position the retractable leg support supports the tabletop portion at a second predetermined distance above the surface to accommodate concurrent use by an individual of the seating portion adjacent the tabletop.

2. The combination of claim 1, in which when in a storage configuration, the seat support leg folds to a plane substantially parallel to a bottom surface of the seating section to accommodate storage of the seating portion within the seating confinement compartment.

3. The combination of claim 1, in which the second tabletop portion further comprising:
  a plurality of second edge portions extending from the second top surface, wherein the second top surface in combination with the plurality of second edge portions combine to form a second seating confinement compartment within the second tabletop portion;
  a second retractable leg support attached adjacent a selected second edge portion of the plurality of second edge portions;
  a second seating portion support brace secured to the second retractable leg support;
  a second seating portion supported by the second seating portion support brace and adjacent the tabletop.

4. The combination of claim 3, in which the second seating portion including at least a second seating section supported by a second seat support leg which collectively support the individual the second predetermined distance above the surface, wherein the second retractable leg support includes a second vertical support portion extending from the tabletop to the surface, and a plurality of second stabilization bars supporting the vertical support portion, each of the plurality of second stabilization bars parallel to a selected second edge portion of the plurality of edge portions, and extending in length a distance of substantially the entire length of the selected second edge portion, and wherein the length of each said second stabilization bars is hinge free.

5. The combination of claim 4, in which the second seating section includes a plurality of second independent support ribs, wherein each of the plurality of second independent support ribs is in non-contacting adjacency with the remaining second independent support ribs to mitigate sagging when said second seating portion is in use, and further wherein said plurality of second independent support ribs are perpendicular to a width of the second seating section.

6. The combination of claim 5, in which when in the storage configuration the second seat support leg folds to a plane substantially parallel to a bottom surface of the second seating section to accommodate storage of the second seating portion within the second seating confinement compartment.

7. The combination of claim 1, in which the seating portion is an integrated seating portion, and wherein in the retracted position the retractable leg support secures the integrated seating portion within the seating confinement compartment.

8. The combination of claim 7, in which the integrated seating portion comprises the seating section supported by the seat support leg.

9. The combination of claim 8, in which the integrated seating portion presents a support configuration, wherein when in the support configuration, the seat support leg maintains the seating section a second predetermined distance from and substantially parallel with the surface to accommodate and support seating of an individual upon the seating section.

10. The combination of claim 9, in which the integrated seating portion further presents a storage configuration, wherein the seat support leg folds to a plane substantially parallel to a bottom surface of the seating section to accommodate storage of the integrated seating portion within the seating confinement compartment.

11. The combination of claim 10, in which the second portion of the hinge communicates with the second tabletop portion, the second tabletop portion comprising:
  the second top surface; and
  a plurality of second edge portions extending from the second top surface, wherein the second top surface in combination with the plurality of second edge portions combining to form a second seating confinement compartment.

12. The combination of claim 11, further comprising a second retractable leg support attached to the second tabletop portion, wherein in a retracted position the second retractable leg support resides adjacent the second seating confinement compartment, and further wherein in an extended position the second retractable leg support supports the second tabletop portion at the predetermined distance above a surface.

13. The combination of claim 12, further comprising a second integrated seating portion, the second integrated seating portion comprising a second seating section supported by a second seat support leg, and configured for confinement within the second seating confinement compartment.

14. The combination of claim 13, in which the second integrated seating portion is substantially similar to the integrated seating portion and configurable into each a support configuration and a storage configuration, wherein when configured into the support configuration the second integrated seating portion accommodates seating of a second individual, and further wherein when configured into the storage configuration the second seat support leg folds to a plane substantially parallel to a bottom surface of the second seating section to accommodate storage of the second integrated seating portion within the second seating confinement compartment.

15. The combination of claim 14, in which upon attachment of the hinge to each the first and second tabletop portions, the hinged joint between the first and second tabletop portions is formed and the tabletop is defined, wherein the defined tabletop comprises a width and a length.

16. The combination of claim 15, in which the hinged joint is formed to traverse the width of the tabletop.

17. The combination of claim 15, in which the hinged joint is formed to traverse the length of the tabletop.

* * * * *